US007899173B2

(12) United States Patent
Ahn et al.

(10) Patent No.: US 7,899,173 B2
(45) Date of Patent: *Mar. 1, 2011

(54) COMMUNICATION CONNECTIVITY VIA CONTEXT ASSOCIATION, ADVERTISING SPONSORSHIP, AND MULTIPLE CONTACT DATABASES

(75) Inventors: Sunny K. Ahn, Newburyport, MA (US); Rod Drury, Mirimar (NZ)

(73) Assignee: Context Connect, LLC, Newburyport, MA (US)

( * ) Notice: Subject to any disclaimer, the term of this patent is extended or adjusted under 35 U.S.C. 154(b) by 970 days.

This patent is subject to a terminal disclaimer.

(21) Appl. No.: 11/654,966

(22) Filed: Jan. 17, 2007

(65) Prior Publication Data
US 2008/0319823 A1 Dec. 25, 2008

Related U.S. Application Data

(63) Continuation-in-part of application No. 10/332,889, filed as application No. PCT/US01/22261 on Jul. 16, 2001, now Pat. No. 7,340,048.

(60) Provisional application No. 60/759,295, filed on Jan. 17, 2006, provisional application No. 60/761,971, filed on Jan. 26, 2006.

(51) Int. Cl.
H04M 3/42 (2006.01)
H04W 40/00 (2009.01)
H04W 4/00 (2009.01)

(52) U.S. Cl. .................. 379/218.01; 455/415; 455/428; 455/437

(58) Field of Classification Search ................... 705/50; 379/27, 218; 455/415, 428, 437
See application file for complete search history.

(56) References Cited

U.S. PATENT DOCUMENTS 4,734,931 A 3/1988 Bourg et al.

(Continued)

FOREIGN PATENT DOCUMENTS

EP 238257 9/1987

(Continued)

OTHER PUBLICATIONS

Onename; Identity-Based Privacy and Permissions Management; http://www.onename.com, 2001.

(Continued)

*Primary Examiner*—Charles C Agwumezie
(74) *Attorney, Agent, or Firm*—Blank Rome LLP

(57) ABSTRACT

Communication connectivity via context association is provided by associating targeted subscriber contact information with a key at a subscriber database. At a data center, the keys are associated with unique characteristics or aliases (contexts) of the subscribers, thereby facilitating context searching. A caller initiates a connection to a subscriber by providing a subscriber's context. The context is located and associated key identified. The key is resolved in the subscriber database, and the call routed. Use of the key allows subscriber connectivity without revealing, to the caller or to the data center, sensitive contact information. Through a caller database, call initiation occurs by subscriber alias identification in a caller's communication device; thereby foregoing inclusion of sensitive contact information within the caller's communication device. Communication connectivity can be advertiser sponsored, with advertisements accompanying messages selected by matching profile information of targeted subscribers with participating advertiser provided profile information of desired targeted subscribers.

14 Claims, 15 Drawing Sheets

FIG. 1

U.S. PATENT DOCUMENTS

| | | | |
|---|---|---|---|
| 4,879,747 A | | 11/1989 | Leighton et al. |
| 4,979,206 A | * | 12/1990 | Padden et al. ............ 379/88.01 |
| 5,204,894 A | | 4/1993 | Darden |
| 5,239,577 A | | 8/1993 | Bates et al. |
| 5,339,352 A | | 8/1994 | Armstrong et al. |
| 5,349,638 A | | 9/1994 | Pitroda et al. |
| 5,371,781 A | | 12/1994 | Ardon |
| 5,404,506 A | | 4/1995 | Fujisawa et al. |
| 5,425,102 A | | 6/1995 | Moy |
| 5,442,703 A | | 8/1995 | Kim et al. |
| 5,452,350 A | | 9/1995 | Reynolds et al. |
| 5,454,032 A | | 9/1995 | Pinard et al. |
| 5,467,388 A | | 11/1995 | Redd et al. |
| 5,483,586 A | | 1/1996 | Sussman |
| 5,491,817 A | * | 2/1996 | Gopal et al. ................. 707/770 |
| 5,509,049 A | | 4/1996 | Peterson |
| 5,509,058 A | | 4/1996 | Sestak et al. |
| 5,511,111 A | | 4/1996 | Serbetcioglu et al. |
| 5,553,119 A | | 9/1996 | McAllister et al. |
| 5,668,955 A | | 9/1997 | deCiutiis et al. |
| 5,689,547 A | | 11/1997 | Molne |
| 5,689,700 A | | 11/1997 | Miller et al. |
| 5,692,040 A | | 11/1997 | Greenblatt |
| 5,734,706 A | | 3/1998 | Windsor et al. |
| 5,749,052 A | | 5/1998 | Hidem et al. |
| 5,768,360 A | | 6/1998 | Reynolds et al. |
| 5,768,362 A | | 6/1998 | Moon |
| 5,794,230 A | | 8/1998 | Horadan et al. |
| 5,796,832 A | | 8/1998 | Kawan |
| 5,799,066 A | | 8/1998 | Joyce et al. |
| 5,802,066 A | | 9/1998 | Miyake et al. |
| 5,802,510 A | | 9/1998 | Jones |
| 5,805,830 A | | 9/1998 | Reese et al. |
| 5,815,808 A | | 9/1998 | Valentine |
| 5,841,854 A | | 11/1998 | Schumacher et al. |
| 5,850,433 A | | 12/1998 | Rondeau |
| 5,853,433 A | | 12/1998 | Spencer et al. |
| 5,862,325 A | | 1/1999 | Reed et al. |
| 5,862,490 A | | 1/1999 | Sasuta et al. |
| 5,864,622 A | | 1/1999 | Marcus |
| 5,864,840 A | | 1/1999 | Levng et al. |
| 5,878,406 A | | 3/1999 | Noyes |
| 5,893,107 A | | 4/1999 | Chan et al. |
| 5,901,214 A | | 5/1999 | Shaffer et al. |
| 5,901,352 A | | 5/1999 | St-Pierre |
| 5,909,650 A | | 6/1999 | Jonsson |
| 5,918,224 A | | 6/1999 | Bredenberg |
| 5,922,074 A | | 7/1999 | Richard et al. |
| 5,926,754 A | | 7/1999 | Cirelli et al. |
| 5,926,810 A | | 7/1999 | Noble et al. |
| 5,956,718 A | | 9/1999 | Prasad et al. |
| 5,958,016 A | | 9/1999 | Chang et al. |
| 5,974,130 A | | 10/1999 | Sadri et al. |
| 5,983,095 A | | 11/1999 | Cameron |
| 5,999,973 A | | 12/1999 | Glitho et al. |
| 6,011,976 A | | 1/2000 | Michaels et al. |
| 6,014,797 A | | 1/2000 | Kuster et al. |
| 6,014,802 A | | 1/2000 | Guerin |
| 6,035,190 A | | 3/2000 | Cox et al. |
| 6,044,142 A | | 3/2000 | Hammarstrom et al. |
| 6,044,205 A | | 3/2000 | Reed et al. |
| 6,047,184 A | | 4/2000 | Haces et al. |
| 6,049,712 A | | 4/2000 | Wallinder |
| 6,049,799 A | | 4/2000 | Mangat et al. |
| 6,052,372 A | | 4/2000 | Gittins et al. |
| 6,052,579 A | | 4/2000 | McCestabrook |
| 6,058,179 A | | 5/2000 | Shaffer et al. |
| 6,065,016 A | | 5/2000 | Stuntebeck et al. |
| 6,069,946 A | | 5/2000 | Lieuwen |
| 6,072,867 A | | 6/2000 | Lieuwen |
| 6,081,705 A | | 6/2000 | Houde et al. |
| 6,081,898 A | | 6/2000 | Miller et al. |
| 6,088,125 A | | 7/2000 | Okada et al. |
| 6,088,717 A | | 7/2000 | Reed et al. |
| 6,094,479 A | | 7/2000 | Lindeberg et al. |
| 6,097,950 A | | 8/2000 | Bertacchi |
| 6,101,541 A | | 8/2000 | Ellesson et al. |
| 6,104,797 A | | 8/2000 | Nabkel et al. |
| 6,104,802 A | | 8/2000 | Perlmutter |
| 6,108,537 A | | 8/2000 | Comer et al. |
| 6,122,359 A | | 9/2000 | Otto et al. |
| 6,122,364 A | | 9/2000 | Petrunka et al. |
| 6,128,503 A | | 10/2000 | Granberg et al. |
| 6,134,446 A | | 10/2000 | Sasuta et al. |
| 6,138,008 A | | 10/2000 | Dunn et al. |
| 6,144,671 A | | 11/2000 | Perinpanathan et al. |
| 6,144,959 A | | 11/2000 | Anderson et al. |
| 6,185,290 B1 | | 2/2001 | Shaffer et al. |
| 6,269,337 B1 | | 7/2001 | Desmond et al. |
| 6,366,913 B1 | | 4/2002 | Fitler et al. |
| 6,396,920 B1 | | 5/2002 | Cox et al. |
| 6,535,726 B1 | | 3/2003 | Johnson |
| 6,546,002 B1 | | 4/2003 | Kim |
| 6,633,633 B1 | * | 10/2003 | Bedingfield ............ 379/201.11 |
| 6,870,921 B1 | * | 3/2005 | Elsey et al. ............ 379/218.01 |
| 7,340,048 B2 | | 3/2008 | Stern et al. |
| 2001/0014598 A1 | | 8/2001 | Cox et al. |
| 2001/0038624 A1 | | 11/2001 | Greenberg et al. |
| 2002/0029178 A1 | | 3/2002 | Wiederin et al. |
| 2002/0055351 A1 | | 5/2002 | Elsey et al. |
| 2002/0118811 A1 | | 8/2002 | Davis et al. |
| 2003/0007625 A1 | | 1/2003 | Pines et al. |
| 2003/0007627 A1 | | 1/2003 | Elsey et al. |
| 2003/0032412 A1 | | 2/2003 | Cox et al. |
| 2004/0062371 A1 | | 4/2004 | Maropis et al. |
| 2005/0002510 A1 | | 1/2005 | Elsey et al. |

FOREIGN PATENT DOCUMENTS

| | | |
|---|---|---|
| EP | 334626 | 9/1989 |
| EP | 372692 | 6/1990 |
| EP | 599558 | 6/1994 |
| EP | 647075 | 4/1995 |
| EP | 689316 | 12/1995 |
| EP | 782315 | 7/1997 |
| EP | 817101 | 1/1998 |
| EP | 823809 | 2/1998 |
| EP | 1301887 | 4/2003 |
| JP | 61141242 | 6/1986 |
| JP | 63260343 | 10/1988 |
| JP | 5175042 | 7/1993 |
| JP | 9294158 | 11/1997 |
| JP | 10308733 | 11/1998 |
| WO | WO9429992 | 12/1994 |
| WO | WO0211396 | 2/2002 |

OTHER PUBLICATIONS

Heller, Mike, Cox, Ed; Phone Numbers on the Move; vol. 229; No. 20; ISSN: 0040-2656; Nov. 13, 1995; 4 pages.
The Network With Smarts; Byte; Oct. 1994, vol. 19; No. 10; p. 51.
The Transformation of the Public Network; Telephony; Mar. 20, 1995; vol. 228; No. 12; p. 88; ISSN: 0040-2656.
Visitalk.com; Communication With Vision; http://www.visitalk.com; 1999-2000.
XNSORG; http://www.xns.org; 2001.
Emi, Hatake, Ryoichi, Ishibashi; System for Preparing Telephone Directory; Journal: Section E, Section No. 1453; vol. 17, No. 587; http://www.dialogweb.com/cgi/document; Aug. 5, 2003; 4 pages.

* cited by examiner

COMMUNICATION CONNECTIVITY VIA CONTEXT ASSOCIATION, ADVERTISING SPONSORSHIP, AND MULTIPLE CONTACT DATABASES

RELATED APPLICATIONS

This application claims benefit of U.S. Provisional Application Ser. Nos. 60/759,295, filed Jan. 17, 2006; and 60/761,971, filed Jan. 26, 2006; and is a continuation-in-part of copending U.S. application Ser. No. 10/332,889, filed May 15, 2003; which application is a 35 USC §371 of PCT/US01/22261, filed Jul. 16, 2001; which claims benefit of U.S. application Ser. No. 09/668,591, filed Sep. 22, 2000 (now U.S. Pat. No. 6,731,927); and U.S. Provisional Application Ser. Nos. 60/218,469, filed Jul. 14, 2000; 60/237,861, filed Oct. 4, 2000; 60/239,570, filed Oct. 10, 2000; 60/249,597, filed Nov. 17, 2000; and 60/270,304, filed Feb. 20, 2001. All of the above-identified related applications are incorporated in their entirety by this reference.

FIELD OF THE INVENTION

The present invention relates generally to an information system, and more particularly to a system and method for connectivity services providing private access to multiple personal directories by context association, and by context association through a third party paid advertising platform.

BACKGROUND OF THE INVENTION

Individuals and institutions are in constant need of information and access to each other and to services worldwide. This critical need for information and access is seemingly limitless and ever present as a consequence of technological advances in communication and connectivity. Nowhere in our society is this need more strongly felt and observed than by Internet and wireless or cellular telephony users everywhere, however, no system is available to serve their needs.

Due to the demand for information, directory assistance is one of the fastest growing segments of the traditional wireline telephone industry. Revenues have exceeded three billion dollars with an estimated call volume in excess of 8 billion inquiries per year. However, the traditional wireline industry is rapidly coming under competitive pressure for use and convenience from the wireless industry.

The cost of service for wireless communication is dramatically decreasing while the features provided are increasing. In addition, wireless communication can offer benefits that wireline cannot. These include 24-hour access in any location, insignificant or non-existent long distance and roaming fees, and in some cases number portability.

The problem with wireless communication that is addressed by the present invention is that there is currently no method for wireless subscribers to engage in commerce by use of their wireless phone number or to access a subscriber, or the number of another wireless subscriber in the same or desperate provider network. This is a significant problem, since wireless service providers have seen an ever increasing number of domestic subscribers, all without a directory assistance listing. Wireless subscribers include traveling professionals, small independent business people, parents, children and "nomadic" students, each with specific needs for connectivity and information, but all of which are entirely inaccessible to the general population unless an information source is developed.

Another problem with traditional telephone directories is the constant demand to maintain and update the called party data. Presently, directory information is limited to traditional wireline services and further limited to include only names and telephone numbers. Due to the dramatic escalation in wireless pre-paid and post paid subscribers and the ever-increasing mobility and demand for services of these subscribers, there is an enormous demand for accurate and up-to-date subscriber data. Another problem with traditional telephone directories is obtaining the desired contact information of the person or company you seek, while only having limited information of their identity.

In 1997, AT&T introduced 00Info. This service was exclusive to AT&T customers only as an alternative to existing directory services such as "411" and "555-1212" and provided access to local and national numbers as well as address and zip code information. As an additional service, AT&T customers could search for a listing by just the spelling of the listing. In 1998, Sprint began to offer their customers national listings in over three thousand communities, and MCI introduced 10-10-9000 for both MCI and non-MCI customers.

Although these systems provide telephone number and some limited address information, none can provide directory access to wireless telephone and Internet subscribers, provide subscriber selected information back to a caller, or direct communication to the subscriber to selected locations such as a home telephone, cell phone, email address, facsimile device, subscriber managed contact information, or e-commerce transaction streams, all of which and more are addressed and solved by the present invention.

Further, with the advent of the Internet and mobile communication, the number of ways individuals communicate with one another has exploded. Consumers have multiple communication devices and communication methods to get connected. As well, consumers belong to multiple affinity groups, whether they are professional, personal or social in nature. These groups could be the local school that one's children belong to, or a project team at work. For these reasons, it is necessary to efficiently manage an individual's contact information various and multiple contact databases. Consumers have mobile phone numbers, fixed line phone numbers, instant message aliases, VoIP numbers, fax numbers, email addresses and other alias-based identities.

A currently existing problem with contact databases addressed by the present invention is an ability to provide accessibility to those with permission, while maintaining privacy protection to sensitive information stored within the database; namely, not revealing contact information, such as a mobile phone number. Further, current contact databases, whether electronic or printed, are often not up to date, containing old and inoperable contact information.

The Internet has also allowed individuals to benefit from alternative communication methods. With the advent of instant messaging and voice over Internet Protocol (VoIP), individuals can communicate with others, often without paying for communication, or at a cost significantly discounted relative to traditional communication methods. The Internet also allows for alternative forms of payment, shifting the burden of payment to other players within the value chain. As a result, emerging services abound where payment for service is not the burden of the individual initiating the communication. For these reasons, combining the ability to place private calls, while shifting the burden of payment to an alternative player has opportunity.

A problem with current alternative payment protocols, such as advertising sponsorship, is that most advertising systems are based on a word or item placed in a search engine, without approval on the type of message that the advertising receiving individual is willing to accept. Accordingly, what is needed is an advertising model providing: 1) advertisements based on a profile of the individual being targeted (recipient's profile"), rather than an individual conducting a search; and 2) the individual targeted decides and selects appropriate advertisement types and subject areas acceptable. The present invention addresses these issues.

SUMMARY OF THE INVENTION

The present invention solves the problem of cross-provider access proprietary information between unaffiliated and competing network providers, but not allow that information to be disclosed to competing providers. The invention provides a system that allows increased utilization and revenue by allowing information from one provider to be accessed and used to complete a transaction or make a connection with subscribers in another carrier or network system without that information being disclosed. The description of the invention for use in wireless or cellular directory assistance is for convenience and illustration of the features of the invention. It is to be understood that the invention has many embodiments and can be applied to any system where confidential and secure access to an entity or services are needed.

In one embodiment, the invention solves the problem of cellular directory assistance and the need for subscriber directed telecommunication by providing wireline and wireless listing inquiries by means of a context association cellular directory assistance system for a nominal fee.

In one aspect of the invention, a cellular phone subscriber's web-managed context association such as, but not limited to, an alpha numeric string, is used as a unique address to locate and provide information, access, or both to a calling subscriber. To place a call or provide access to the subscriber, the invention associates a subscriber with a cellular phone number by context association. The subscriber manages context associations on the web, by telephone, short message (SMS), or any other means to access the listing creation mechanism, with conventions that are established by each subscriber. The invention provides for selectable levels of security allowing the subscriber to determine access and identification at all times. In addition, companies or institutions, and subscribers can group subscribers into communities for internal or external access as required.

Each community can provide its own context associations for its subscribers, allowing them to be easily identified by pre-existing or specifically created conventions (contexts). Other members of the community can therefore easily find a subscriber included in the subscriber's calling community or circle. Accordingly, the present invention goes beyond one-to-one relationships between a phone number and a user by providing context associations and relationships between a subscriber and its community.

The present invention solves the problem of gaining access to a single or multiple contact databases of users. The invention allows subscribers to access a single or multiple contact databases via a centralized location, where a subscriber finds the targeted individual or group of individuals and connects with them, without knowledge of the contact information (e.g., phone number, email address) of the subscriber's communication device, such as a mobile phone. The contact database is managed either by the subscriber, the administrator of the group or network, or a service provider of the targeted subscriber or group, and is accessible by an individual within the user interface of a communication device, including, but not limited to, a mobile phone, fixed phone, email, fax phone.

Further, the present invention solves the problem of providing connectivity to an individual or group of individuals, while providing privacy and shifting the burden of payment to an alternative party. The selection of an appropriate alternative party can be based on profile information provided a recipient. Shifting the burden to an alternative party can be in conjunction with, or separate from, solving the problem of private access to a single or multiple individuals by allowing direct connectivity without revealing the contact information (e.g., mobile phone number) of the individual or group of individuals targeted.

In one aspect of the invention, an individual creates an appropriate alias such as, but not limited to, an alpha numeric string, that is a unique identifier to the individual. The alias is linked within the appropriate group and only contain the alias of the individual or group of individuals. The individual aliases are linked to the actual contact information (e.g., mobile phone number) of the individual through a key value. This key value allows an individual to contact another individual via the alias without revealing the actual contact information of the recipient. This ensures that people can be found, within the groups or communities within which they belong, without losing control of their privacy.

BRIEF DESCRIPTION OF THE DRAWINGS

For the purpose of illustrating the invention, there is shown in the drawings a form, which is presently, preferred; it being understood, however, that this invention is not limited to the precise arrangements and instrumentalities shown.

Figure 10:
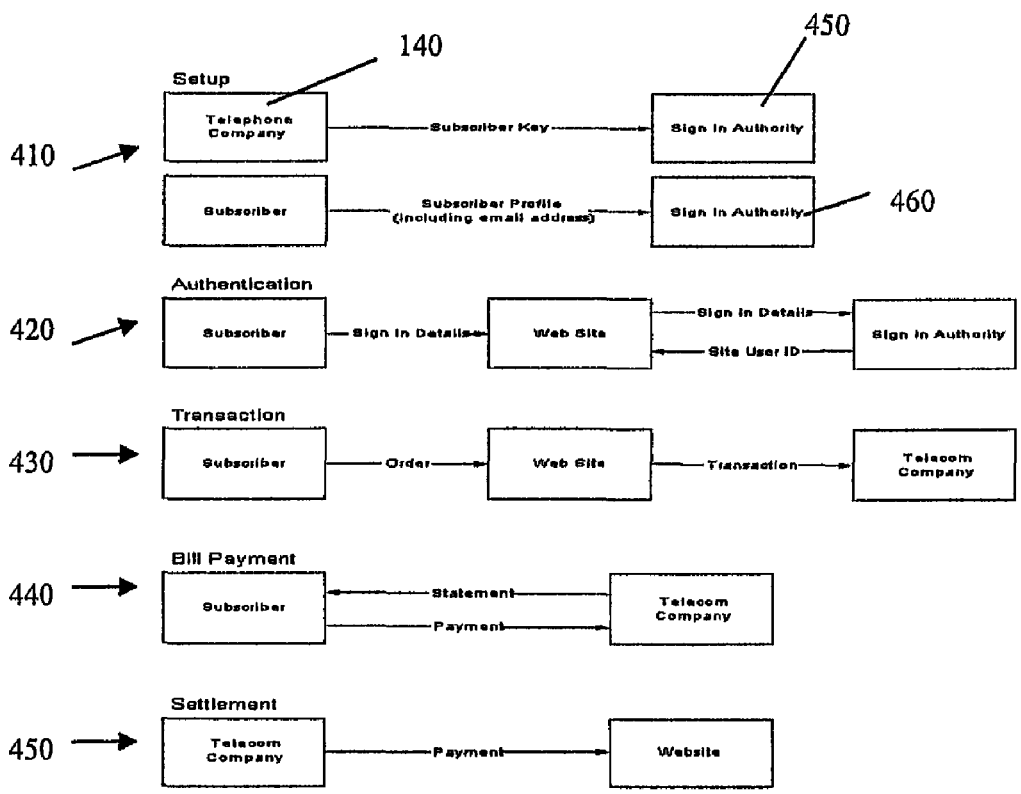
FIG. 10 is a flow diagram illustrating the method of e-commerce transaction of FIG. 9.
Figure 13:
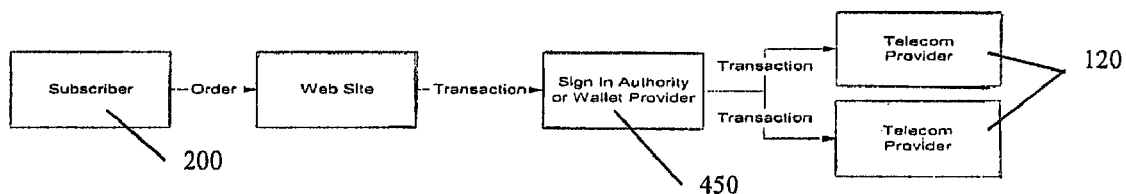
Figure 14:
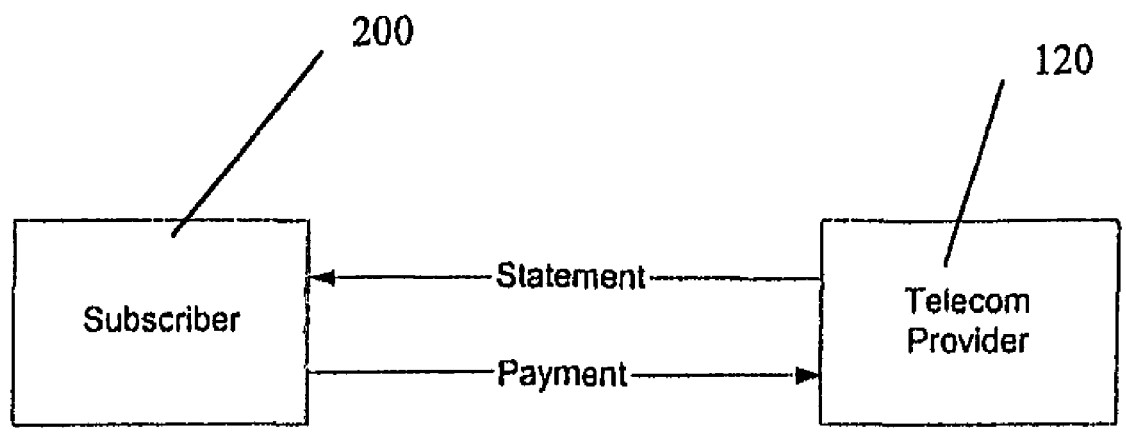
Figure 15:
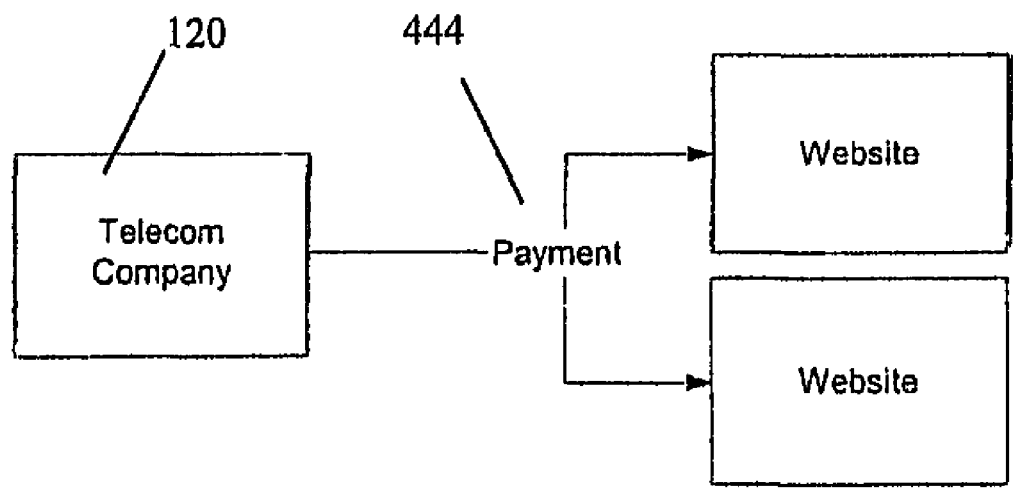
Figure 16:
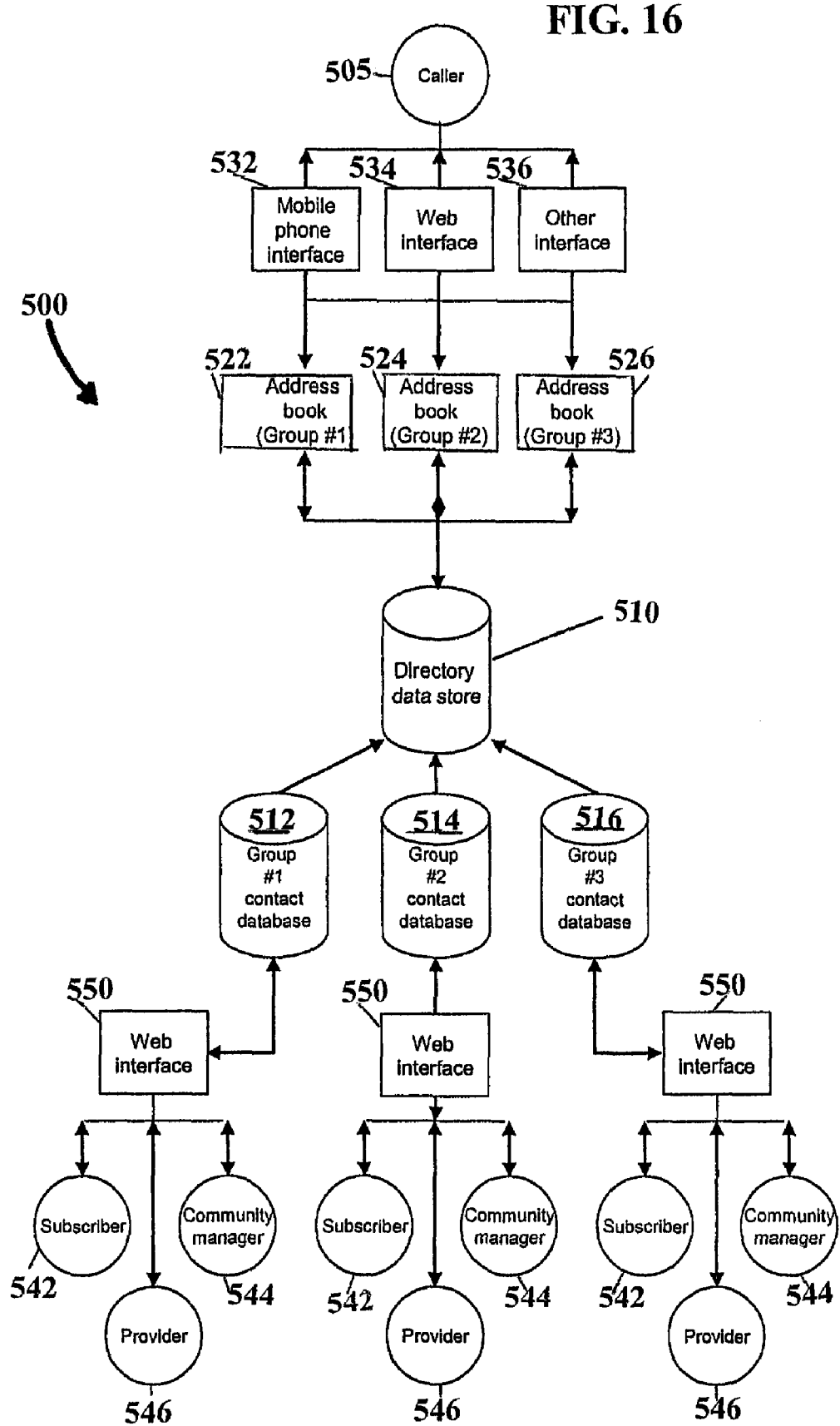
Figure 17:
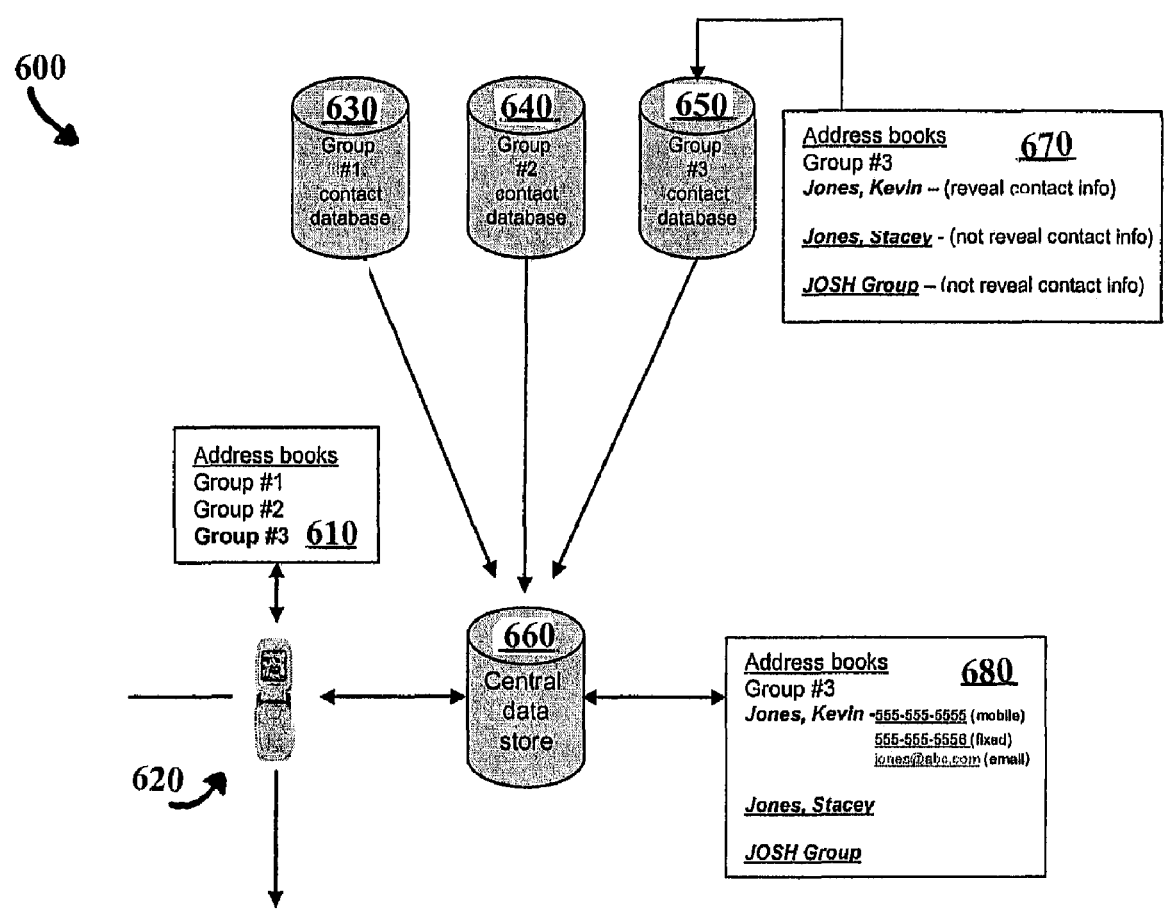
Figure 18:
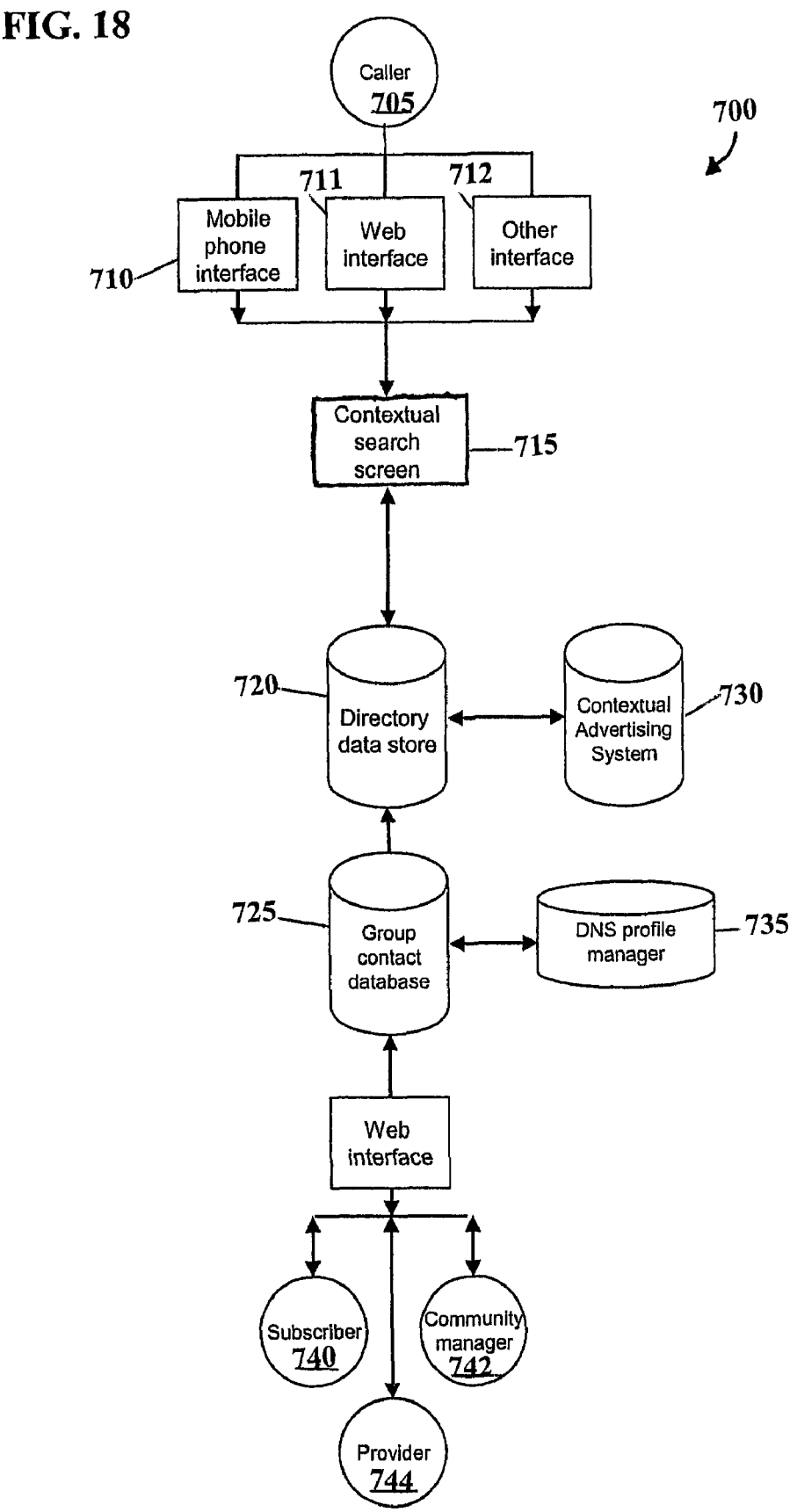
Figure 19:
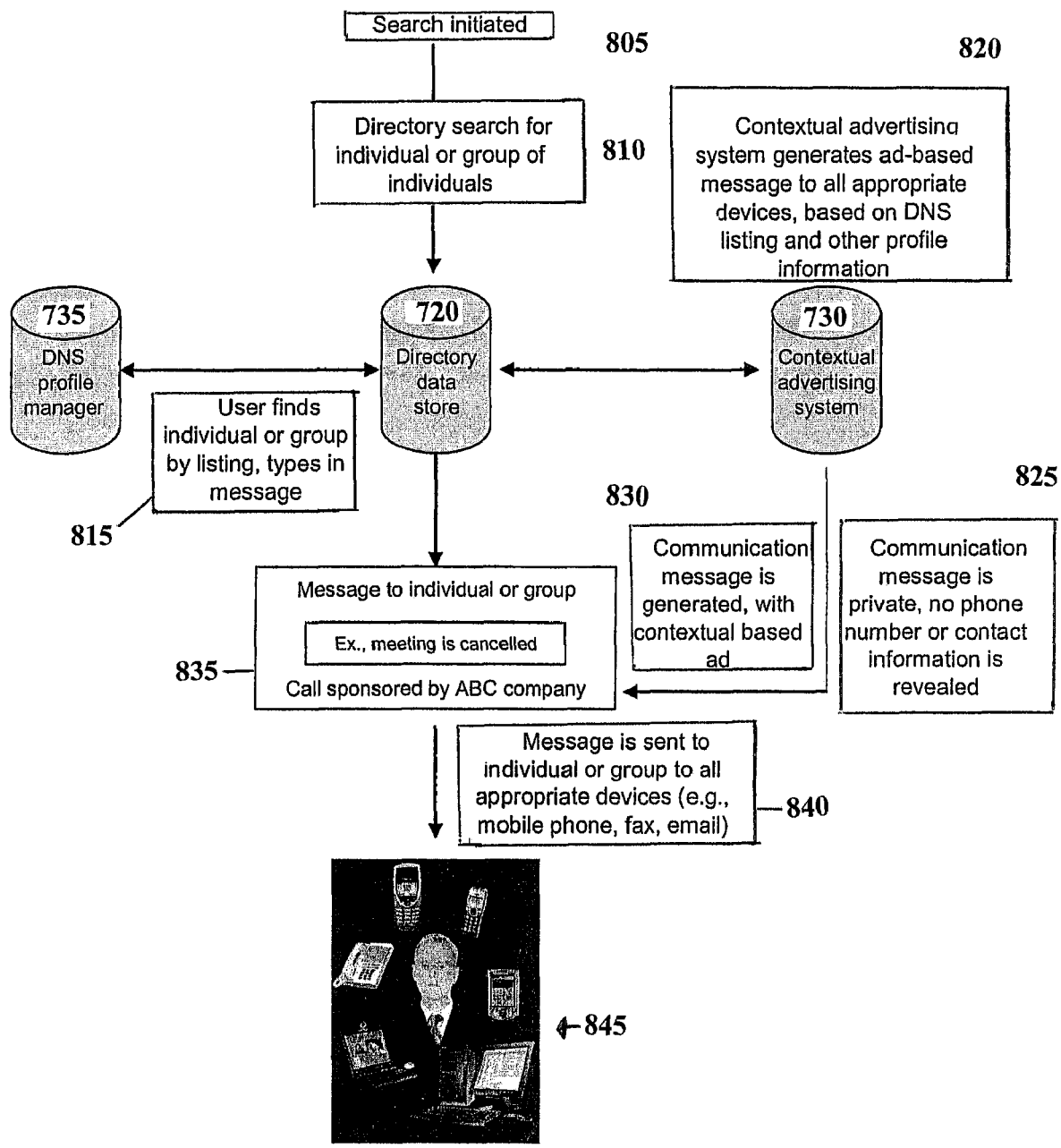
Figure 20:
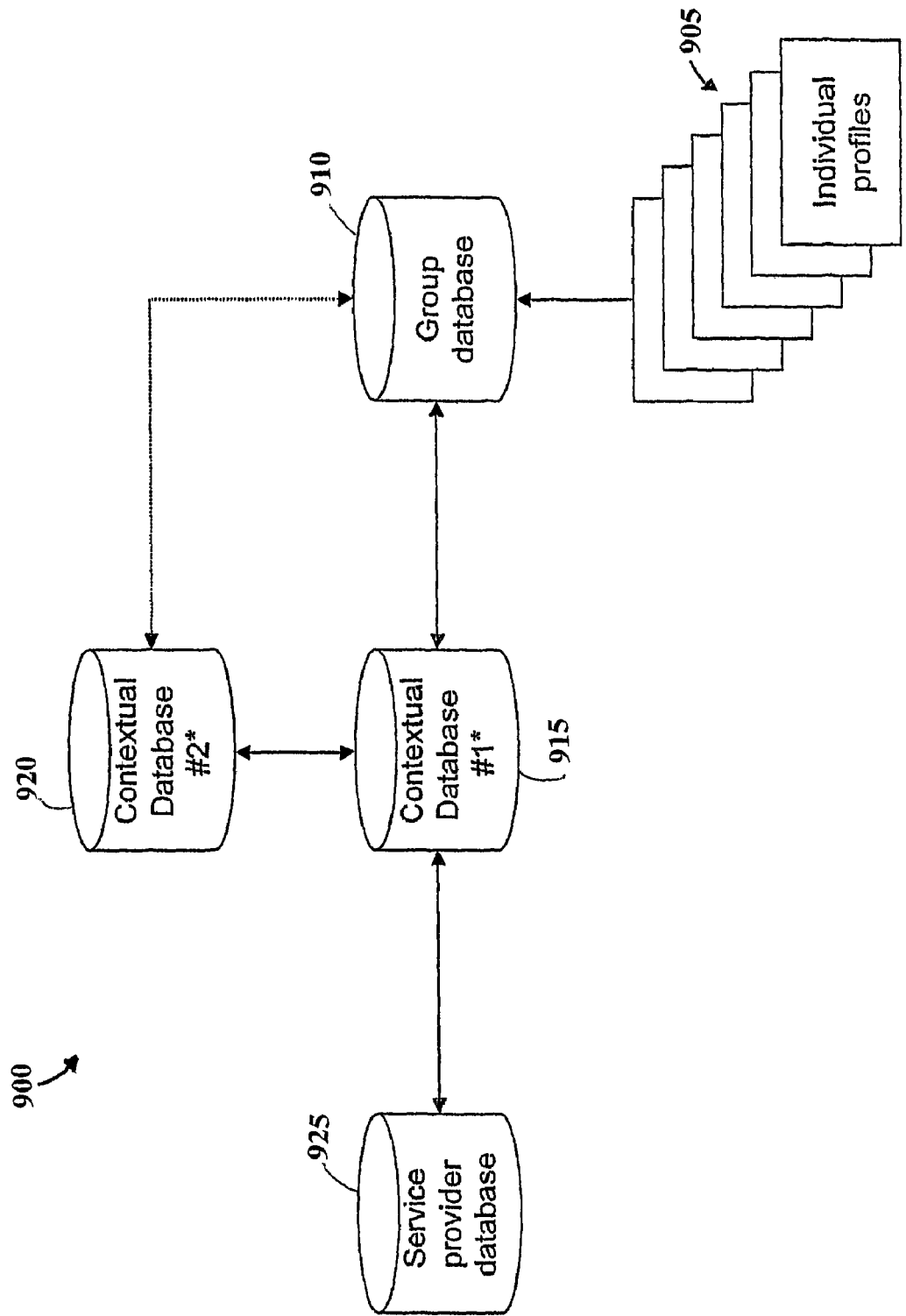
Figure 21:
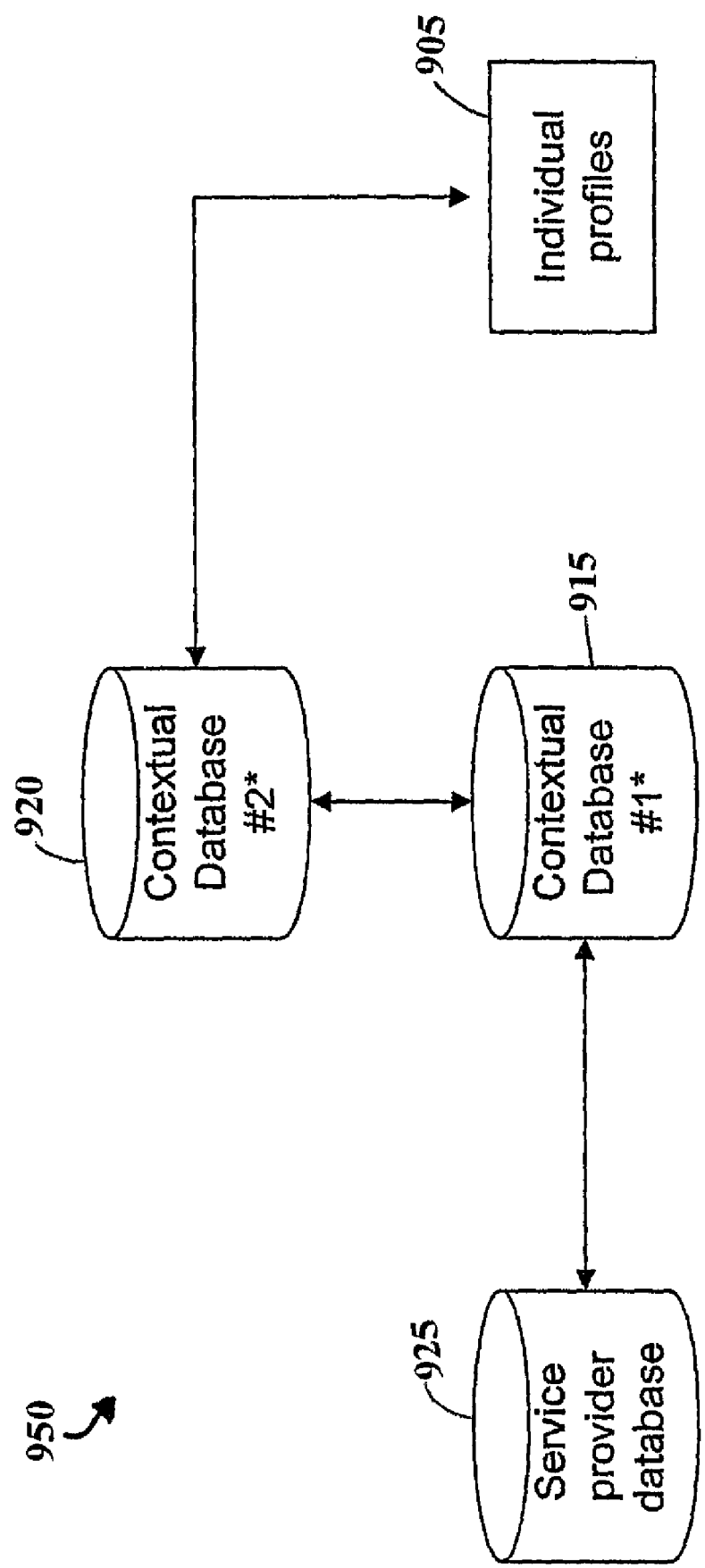
Figure 22:
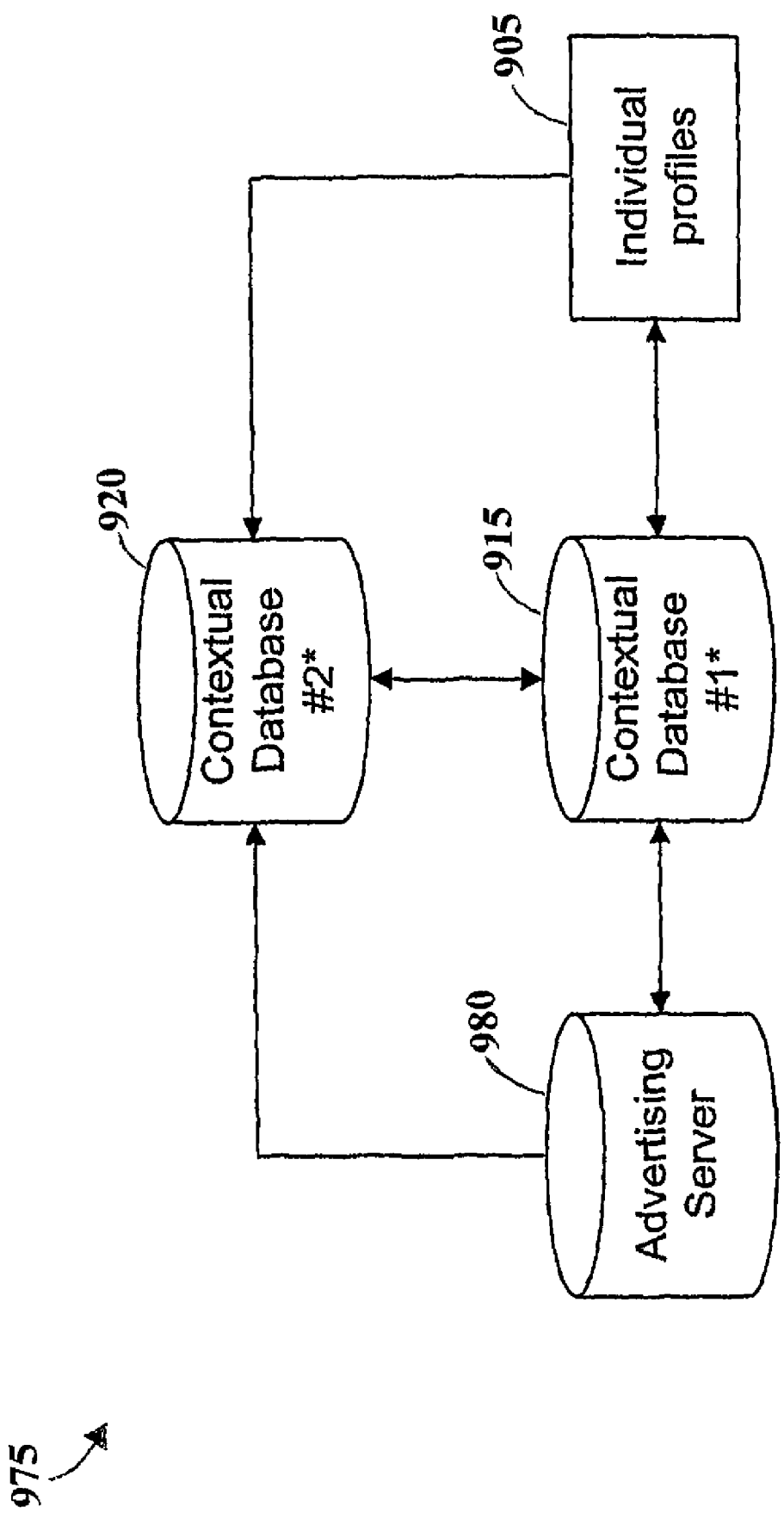

10, providing for secure transactions by establishing a relationship between a subscriber, a network provider, and a sign-in authority;

FIG. 13 is a flow diagram illustrating a transaction process for the method of e-commerce transactions of FIG. 10;

FIG. 14 is a flow diagram illustrating a bill presentation and payment process for the method of e-commerce transactions of FIG. 10;

FIG. 15 is a flow diagram illustrating network provider compensation for executing the transaction in the method of e-commerce transactions of FIG. 10;

FIG. 16 illustrates a multiple client/server based contact database system according to one embodiment of the present invention;

FIG. 17 illustrates a contact information data management system within the multiple client/server based contact database system;

FIG. 18 illustrates a model system for storing and analyzing context data according to an advertising sponsored connectivity model of the present invention;

FIG. 19 illustrates a connectivity flow diagram of an operating embodiment of an advertising sponsored connectivity model of the present invention;

FIG. 20 illustrates an example embodiment of the multiple client/server based contact database system;

FIG. 21 illustrates another example embodiment of a multiple client/server based contact database system; and FIG. 22 illustrates an example embodiment of the advertising sponsored connectivity model of the present invention.

DETAILED DESCRIPTION OF ILLUSTRATIVE EMBODIMENTS

Referring now to the drawings, wherein there is shown in FIGS. 1 through 4 an illustration of the present invention embodied in a wireless or cellular directory assistance system according to one aspect of the present invention. The terms wireless and cellular are used interchangeably.

Wireless Directory Assistance

Figure 1:
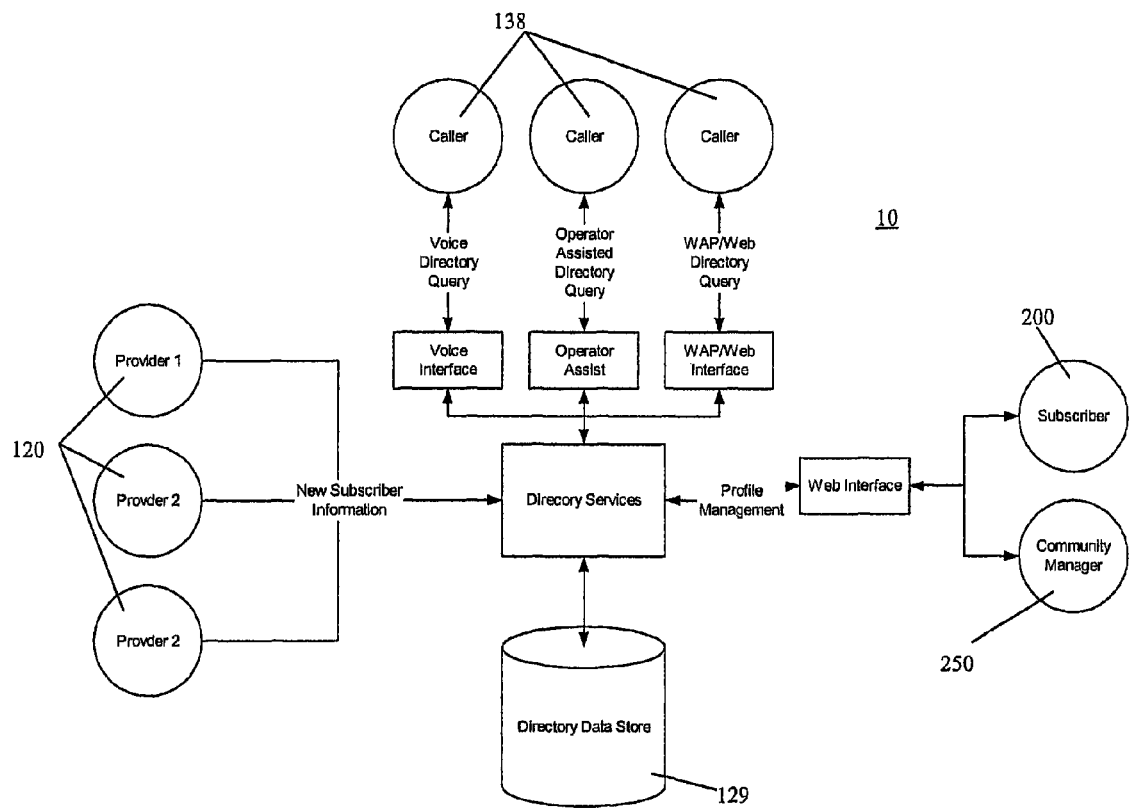
FIG. 1 illustrates a cellular directory assistance system according to one embodiment of the present invention.
Figure 2:
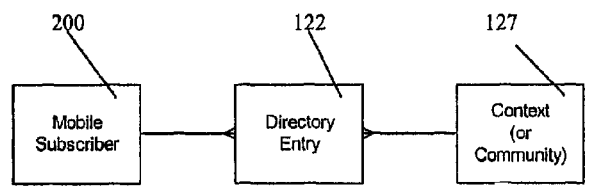
FIG. 2 illustrates a high-level data model according to one embodiment of the present invention.
Figure 3:
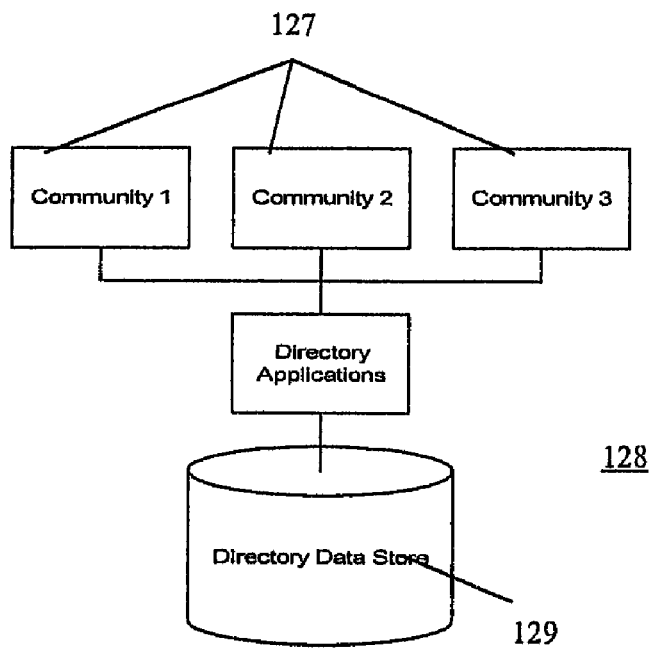
FIG. 3 illustrates a model for context data to be stored and analyzed according to one embodiment of the present invention.

In FIGS. 1 and 2 illustrate a wireless directory assistance system 10 and a high-level data model illustrating the context relationship between a subscriber and its community according to the present invention. A context includes, but is not limited to, a domain of predetermined conventions that are associated with predetermined individuals (subscribers) or predetermined services and used to locate subscribers by means of users (callers) having discrete knowledge about characteristics or conventions relevant to the individual or service desired. A subscriber can be an individual, company, bank account or service that is targeted or desired by the caller or user of the method and system.

Figure 4:
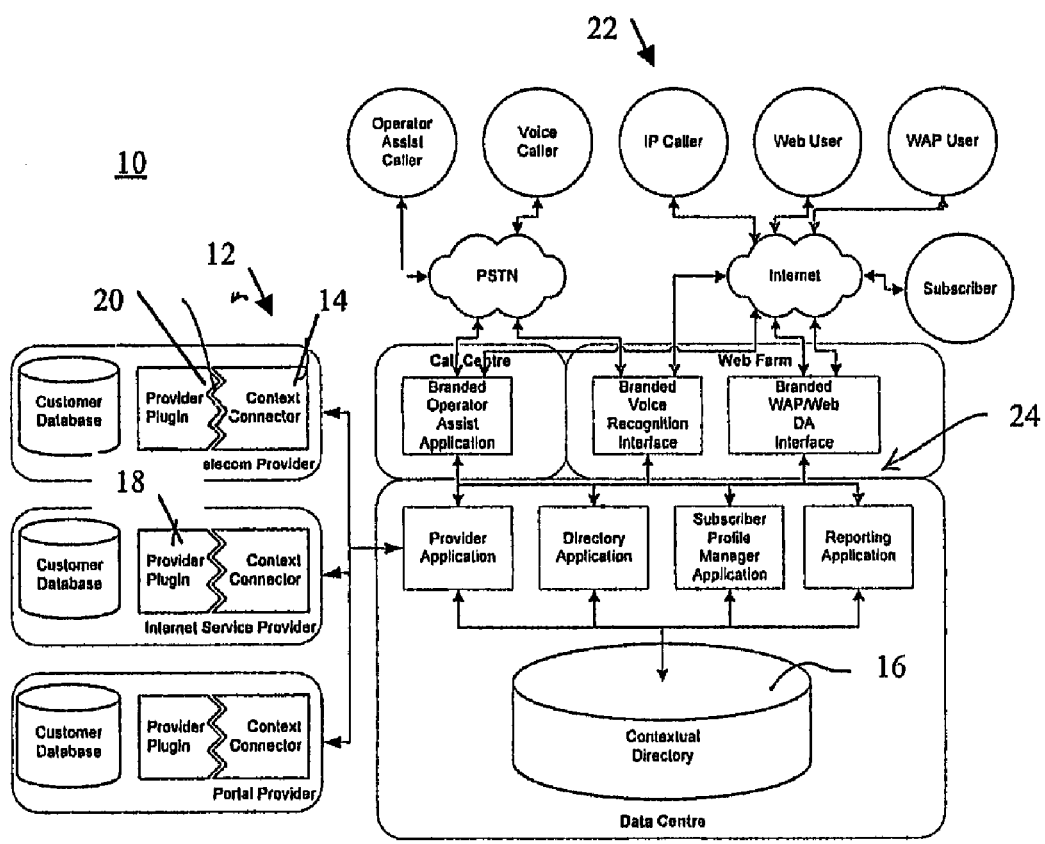
FIG. 4 illustrates another model for context data to be stored and analyzed according to one embodiment of the present invention.

In FIG. 4 a high level architecture 10 of the invention is shown applied to a directory assistance system. The left side 12 of the diagram represents the relationship with a partner provider, whether telecom, internet or portal. A component called the 'context connector' 14 is installed at each partner provider. This component provides the interface to a contextual directory 16. The provider plugin 18 is a custom application that is developed with the assistance of the partner provider to interact with the partner provider's subscriber (customer) database. The context connector 14 can be configured to hide the actual contact number, and creates a private and secure link through use of a key between the directory assistance system and the subscriber (customer) database. This key is made available to the contextual directory 16.

The context connector 14 is also used to receive a resolved directory lookup 20 into the partner provider's network where the key is resolved and the call or service is placed.

The top part of the diagram illustrates the various interfaces 22 available to the users (callers) of the service. There are multiple interfaces (Voice Call, Web, WAP) available to the service. Both the telephone network and the internet can be used. The center of the diagram illustrates the components 24 making up the directory assistance application. These include an application that manages the interfaces to the partner providers and provides the directory lookup. The application allows the data in the directory to be managed by authorized users, context administrators, and subscribers. There are also various reporting and billing applications. An important feature of the directory application is that the contextual directory 16 can store the information for subscribers and their contexts. The invention includes a method for providing information to a subscriber having the steps of associating a subscriber with at least one predetermined context. Association with at least one context then accomplishes location of the subscriber. Access to the subscriber is provided when at least one context is located.

In one aspect of the invention, at least one context includes at least one subscriber fact such as, but not limited to, a phone number, address, nickname, identification number or job title. The context also includes a context key that broadly defines a subscriber or group of subscribers such as a company or department name or geographical location that is used to locate at least one subscriber. The context key includes a domain of predetermined conventions such as a type of business or service or any desirable characteristic that may be desired to associate a subscriber, or individuals, or services, or some combination thereof.

Secure Identity Key

Figure 6:
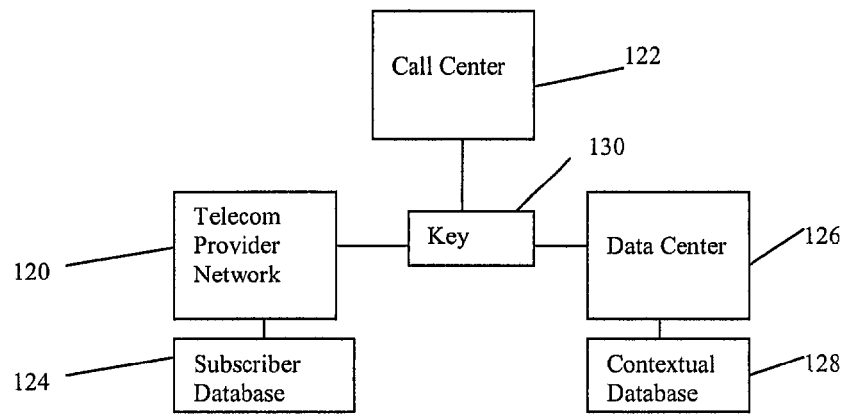
FIG. 6 illustrates major system components of the directory assistance system according to one embodiment of the present invention.

Referring to FIG. 6, security is another feature of the invention that is provided by a secure identity key 130. The key 130 is used by the system 10 for associating contextual associations of the subscriber in the contextual database 128 with contact information of the subscriber in the subscriber database 124 of the provider network 120. Callers or users having discrete knowledge of the context listing of the individual (subscriber) or service can reach the subscriber, but will not have access to the provider network 120 or any proprietary information about the subscriber, such as identity or telephone number unless authorized by the network provider 120. Although the context associations listed in the contextual database 128 are freely selectable by the subscriber or provider network 120, the secure identity key is controlled by the network provider 120.

Subscriber Statistics

Revenue and statistic generation is also a feature of the invention and is accomplished in a number of ways. For example, a charge to a user or subscriber may be charged or collected when access or information is provided or requested or when at least one context is located. Billing can be acquired from the callers' service provider. The billing agent of the callers' service provider would then forward the fee to the directory assistance system of the present invention which would provide a suitable percentage to the provider network 120 for the extraction of the subscriber contact information.

Access to a subscriber may be provided by acquiring a list of predetermined subscribers, associating at least one predetermined context for each predetermined subscriber on the list, locating at least one context, and then providing access to one or more predetermined subscribers on the list when at least one context is located.

In another aspect of the invention, access to a subscriber can be provided by establishing a list of predetermined contexts, establishing a list having at least one predetermined subscriber, associating at least one predetermined context for each predetermined subscriber, locating the at least one context, and providing access to one or more predetermined subscribers when at least one context is located.

Associating a predetermined subscriber with at least one predetermined context can be used to provide access to a subscriber. This may be accomplished by locating at least one context, and providing access to the predetermined subscriber when at least one context is located. The context includes network provider and/or subscriber determined terms for association with the subscriber. Association with the subscriber is accomplished when the context is within a domain of conventions that are associated with individuals or services for locating subscribers by users with discrete knowledge about the individual or service desired.

An enhanced directory allows subscribers, users, community managers and providers the ability to determine their context listing and to selectively manage that listing. For example, a person might be known as "John Smith at Your Corporation", "John at Your Soft Ball Team", or even "Dad at My Family". The subscriber, network provider or subscriber group manager can change these context listings as required. Another feature of the system also allows the caller 138 seeking a connection to contact the directory service and establish the context of the required listing. The enhanced directory can further include a demographic database, and the methods could use or require demographic information for the subscriber.

Subscriber Groups

There are a number of benefits to the proposed system.
1. People can be found by their "context". It is easy for people "within the context" to contact their members. For example, a Softball coach can quickly get a hold of his or her team.
2. The system can restrict knowledge of the subscriber's phone number. The subscriber can be contacted without revealing the subscriber's number. The system allows the subscriber to remove himself from a community and therefore remove unwanted calls without changing the subscriber's phone number.
3. Implementing these "contexts" makes the directory a suitable platform to leverage advanced network features like call groups and conferencing, as well as offering new tariff models and creating 'one to many' revenue streams.
4. The directory becomes a highly valuable information source of people grouped by their interests.
5. Providing applications for communities to manage their members creates an opportunity for cellular operators to provide a value-added service that will drive new connections or convert competitor connections to their service, virally, by empowering the community administrator.

Subscriber Managed Context Association

Management of individual or group contexts or profiles (a person can belong to multiple contexts) is made available over several interfaces such as a wireless phone or the internet. One advantage to subscriber access is that there is almost no cost associated with subscriber-based maintenance of listings. In addition, "community administrators" can manage their own communities. For example, the coach of a Softball team may be the only person authorized to add members to the context.

The population of the directory then becomes viral, which means that community administrators enter their own communities. This provides unlimited expansion and additional value and incentive for target communities to increase connections. This viral model also makes it easier to sign up provider networks.

The database can provide the platform for a number of related applications. With all this attributed data stored in a single logical store, the store becomes very valuable.

Cellular provider networks send new subscriber information to the directory assistance system of the present invention. All interfaces use XML messaging or other computer languages so subscriber transactions can be automated between the invention and the cellular provider networks. In addition, the system can be used to develop data mapping for each major provider network.

Community administrators can add members to their community, and update member details. An individual subscriber can maintain a subset of their information as well. This feature provides the subscriber with the ability to remove itself from a community, thereby "de-listing" itself from the community.

This feature enables a value proposition for subscribers to reveal more of their profile, making their directory information more valuable.

Callers seeking directory assistance can enter the directory assistance system of the present invention through a number of channels. The caller can dial a branded provider or an independent directory information number to receive operator assistance. Or the caller can dial a number and use tones to navigate to the information they desire. The invention also contemplates user access by use of voice navigation. Callers can also search a web site for contact numbers of subscribers who have agreed to have their numbers listed by a particular context on the website. This web directory also includes a small web application that can be "framed" into a related community web site, if a related community website exists. Other interfaces like WAP (Wireless Access Protocol), or a HTML browser (like Web TV, Palm PCs and PlayStation 2), or a Voice Portal can easily be supported by the architecture of the present invention.

The invention opens the directory database to the internet and to wireless devices, allowing subscribers to manage the amount of directory context data they want exposed to the world.

Direct Connect

Another feature of the invention is direct connect cellular directory assistance, providing wireline or wireless access to any cellular phone subscriber. An inquiry would originate from either source, be received into the present invention's call center, and ultimately be connected to the requested party.

Direct connect cellular directory assistance can be accomplished by an operator of the present invention obtaining the pertinent information to be used for a contextual search for a subscriber. Pertinent information would include such things as name, city and state, and the cellular provider if available.

In addition, the direct connect directory assistance service is capable of receiving an automated (no operator) SMS (short message service) or WAP (wireless access protocol) based directory assistance query. The call center of the present invention locates the subscriber number (perhaps through contextual association) and a call switch creates the call legs without revealing the subscriber number to the automated inquirer.

Further, the direct connect directory assistance service can connect a voice or other communications transaction to one or many subscribers by receiving a contact request to a device (which may or may not be the voice device of the subscriber) and directing a call switch to connect the communication without revealing the subscriber contact number. Examples are: 1) sending a call request from SMS; 2) creating a call request through WAP; and 3) creating a call request on a PC internet browser.

One advantage of using the call switch to connect the communication is that if either the caller (inquiring party) or the called (subscriber) party is not available at the time of the call request (whether by voice, SMS, SAP or PC internet browser), the call switch can hold the call request until both parties are available and complete the connection by calling both parties at the time of mutual availability. Another advantage of the above scenario, communications can occur without requiring a phone (of either the calling or the called party) to have keys or a screen, and provides an internet calling model where calls are requested over the internet but delivered over existing voice networks.

Multiple Provider Networks

When a desired subscriber, service, or listing is found the operator directly connects the user or inquirer to the listing and the calling individual is charged for the connection and the call. This transaction is carried out without revealing the target subscriber's phone number or the Internet Protocol ("IP") address used by the computer attached to a TCP/IP network or fax number. This system thereby allows multiple providers to link their respective subscribers without revealing specific information about their respective subscribers. This maintains the security of the target subscriber's data so that the cellular provider networks maintain the value of their customer database. As digital platforms become the standard and Personal Communications Services evolve, the caller should at least reach a subscriber's voice mail. From that point a message could be left or if connection is established, the subscriber can give the subscriber's number to the caller.

A system for providing access to a plurality of subscribers is also provided by means of a directory and director. The directory includes addresses that are contextually associated with a predetermined subscriber or service. Each address provides access or information to one or more subscribers. The director provides access or information to one or more of the plurality of subscribers by associating one or more of the plurality of subscribers with at least one predetermined context.

The director provides statistics regarding the subscriber or service accessed, and can accept information from the associated subscriber that determines whether another can have access to the subscriber or provide information (contexts) about the subscriber. The director manages the information associated with a subscriber that determines whether another can receive information about the associated subscriber. By determining whether another can have access to the subscriber or receive information about the subscriber, the director can prevent (limit) association with the one or more subscribers.

A secure identity key that is either provided or created for the association controls association with one or more participants. The directory associates a secure identity key to at least one or more subscribers and can establish or collect a predetermined charge when access is provided or when at least one context is located. In another aspect of the invention, a system for providing access to a subscriber includes an associator, a locator and a provider. The associator associates a predetermined subscriber with at least one predetermined context. The locator is used for locating the at least one context, and the provider provides access to the predetermined subscriber when at least one context is located.

Another feature of the invention is single number internet access. This feature provides a fee per inquiry or fee per extraction internet based cellular phone number directory. Data would be provided from cellular provider networks through the same contractual arrangement as direct connect. Requested numbers would be transmitted and billed through e-mail via the Internet Service Provider ("ISP") rather than through cellular or wireline billing.

Internet access would be similar to direct connect in that there would be a need for a database control facility. The facility would not require the amount of space or staff that the direct connect center would require due to the state of technology and the definition of real time.

Under this scenario, real time could be as long as 5 to 7 minutes. This would allow the operator to handle a higher volume of calls. Also, the technology is available to "forward an inquiry" rather than having to re-type the information. It is envisioned that at some point in the future the operator would act only as a gatekeeper with the whole system being automated.

The process would be a currently recognized process. Inquiries would originate from a web page. The web page would explain to the customer that there is a fee for this service and that the inquirer will be billed via their ISP. The inquiry would be obtained through a point and click information box and transmitted directly to the center of the present invention.

Once the inquiry is received, it is forwarded to the appropriate cellular service provider network and a search made. If a match is found it is transferred either to the center of the present invention or directly to the inquirer via return e-mail. It would be at that point that billing takes place. Even if no match is found, a return message indicates that no listing was found and billing occurs.

Another feature of the invention is for use with a company maintained database. This feature provides the creation, maintenance, and cleaning of a corporate database. The present invention would contract with the cellular providers to develop a database consisting of all current and future subscribers. This is the database accessed when an inquiry comes in.

Changes in the service provider's customer listing are transmitted to the present invention's facility on a daily (possibly hourly) basis.

Under this scenario, an inquiry arrives, operators search the company database and a direct connect is provided if a match occurs. Billing is provided through the initiator's (caller's) service provider (wireline or wireless).

Analysis of requests would provide the information to tune the invention and provide additional services like 'last 10 numbers' or 'my favorite numbers'. Cellular provider networks would be compensated through a licensing fee or a fee plus a percentage of direct connects for listings of their subscribers.

Another feature of the invention is a direct connect platform by geographic region or area code. This feature consists of system operation by one entity for specific geographic region or area code grouping. An active national and international network of the invention would be achieved by the cooperation of local franchisees.

Each subscriber organization would need to contract with local or regional service provider networks for access to their database. Franchisees in other areas could access each other's network using the same process as any inquiry. Although the directory is currently based on cellular numbers, it can include any form of communication including, but not limited to, email, facsimile devices, Personal Digital Assistant ("PDA"), pagers and other electronic devices.

Another feature of the invention uses a Domain Name System ("DNS") model for cellular directory assistance by creating relational pathways to identify a person without using or knowing their number. Another feature of the invention provides a person with multiple directory entries based on their context. Another feature of the invention is a viral information capability that provides for subscriber selectable and definable information protocols enabling communities to define themselves and assign members into their directory. Another feature of the invention provides a base platform for other value added directory applications such as email directory, follow me, smart diverts, and interest matching. Another feature of the invention finds the digital address of any cellular phone, pager, PDA, or other communication device.

In an alternative embodiment, a user queries a Web site. By entering the context information, which may be done in a free-form or unstructured database interface, the user is given one or more potential associations. For example, a user (inquirer) might enter the string "Bob sailing California". If the context provides more than one possible match, the system can respond with additional context-based information relating to each possible match, such as employer, city of residence, other hobbies, etc. In addition, the directory assistance system, the user or the subscriber can screen or block positive absolute identifiers, such as the subscriber's telephone number, email address, physical address or the like.

Once the user (inquirer) has identified a desired subscriber on the website directory assistance system, the user then indicates that he wishes to be connected to such subscriber. This may be done by a single click on an appropriate icon. If the subscriber has more than one mode of contact (e.g., landline, mobile phone, facsimile, email address, etc.), a menu allows the user to pick the desired mode of contact. For telephone-based contacts, including facsimile, the user can be supplied with a telephone number and a unique identifier code. The telephone number may be a "1-900" number or other similar number by which the user (caller) is charged for the telephone connect time, which is automatically billed to the caller's provider. The user dials the telephone number, and upon automated system answering, enters the unique identifier number. The system then translates the unique identifier code to the appropriate telephone number of the subscriber, and connects the user to the subscriber.

The unique identifier code may be set so that it is valid only for a specified period of time, such as twelve hours, twenty-four hours, or so on. After the expiration period of the unique identifier code, the user must again employ the internet-based directory assistance system and obtain a new unique identifier code for the subscriber. Alternatively, the unique identifier code may be permanent, but the subscriber may have the option, at any time, of canceling or deleting the unique identifier code. If the subscriber deletes the unique identifier code, and also changes or deletes context-based information, the subscriber cannot thereafter be reached by a user employing the same context-based information.

For e-mail connections, there can be a charge to the ISP. Alternatively, a credit-card based account system may be established, whereby a user is charged a fee for each email transmitted. The email may be transmitted to a specified address including the unique identifier code and appropriately routed to the intended subscriber.

E-commerce and Revenue Generating Transactions

Figure 9:
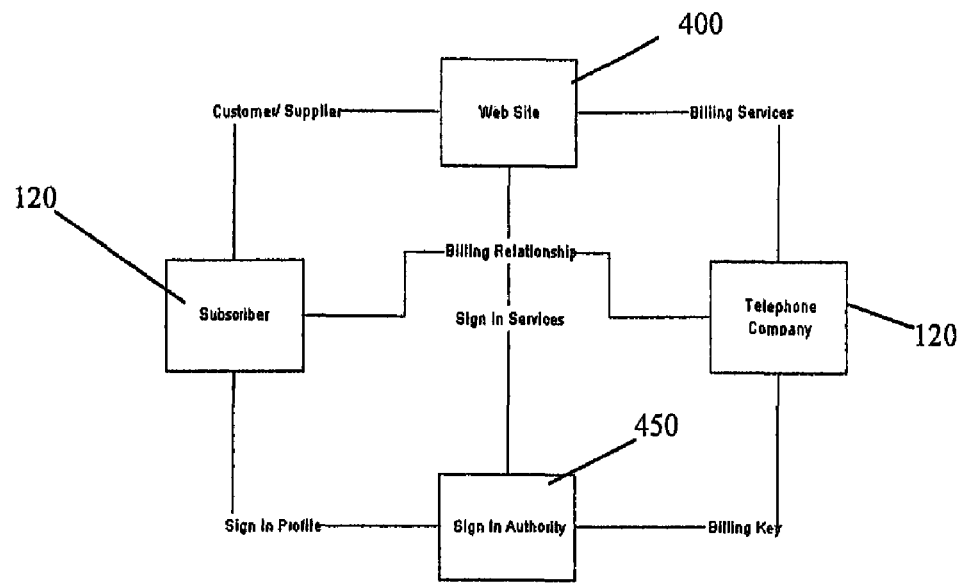
FIG. 9 illustrates a relationships overview of components of a method of e-commerce transactions, in accordance with one embodiment of the present invention.

The present invention 10 includes a method of commerce for internet e-commerce transactions, which is illustrated in FIGS. 9 and 10. As shown in FIG. 9, a network provider 120 maintains a billing relationship with its subscribers 200, which can include standard billed subscribers or pre-paid card or telephone users. The billing relationship with the provider is used by the system 10 to facilitate e-commerce expenditure by means of a subscriber email addresses, which is connected and linked to the subscriber 200 by the context listing 128.

Background

E-commerce web sites usually require transactions to be paid with a credit card, and the user is typically identified to the web site by an email address and password.

The present invention 10 allows network provider 120 to use their significant billing competencies, infrastructure investments and customer billing systems to earn revenue. Network provider billing systems are accustomed to handling high volume lower value transactions. At the heart of the network provider-billing system is the phone number, which is recorded for each call. By means of the subscriber identification key 130, network provider customer data can also be made available without loss of security, provider proprietary information or subscriber confidentiality.

Solution

The present invention provides a method for exploiting telecommunication network provider billing systems and the context directory assistance system 10 to conduct e-commerce transactions. This is accomplished by linking the subscriber email address (or other online identifier) with its telephone number by means of a pre-assigned secure identity key 130. The key 130 allows the network provider 120 to bill e-commerce transactions to a subscribers telephone bill without the subscriber's (e-commerce purchaser's) phone number being revealed to the e-commerce merchant.

The flow of the e-commerce transaction is shown in FIG. 10. At sign-in 410, security for the transaction is provided by a process that establishes the relationship between the subscriber 200 with an email address, the network provider 120 with a phone number, and the sign in authority 450. The sign-in process 410 is executed by means of a centralized authentication server 460. At the web site, the subscriber 200 completes the online contract and ensures their details are correct. Following authentication 420, affiliated web sites enable payment at their sites. When a purchase of this type is made a transaction is recorded by the sign in authority 450.

The sign in authority 450 passes these transactions to the network provider 120. The network provider looks up the subscriber account based on the key 130 that is passed it by the system 10 for authorization of the transaction. These transactions are then billed to the appropriate subscriber and appear on the network provider's monthly statement. The Provider then reconciles the transactions and pays each of the affiliate web sites.

Pre-Pay Subscriber Directory Assistance

The present invention 10 also provides directory assistance for pre-paid subscribers 500 which is a major breakthrough for existing Directory Services since pre-paid subscriber data is often not collected or validated when the customer signs up for service In order to allow a pre-paid subscriber to interact with the context directory system 10 that maintains directory listings and other contextual listing information, it is necessary to verify the identity of the pre-paid subscriber. This process is normally straightforward for "post pay" subscribers—people who have an established account with a provider. The process is more complex for an initial prepay subscriber. The provider often has very little information about the prepay subscribers that can be used to independently verify its identity. A few examples of initial pre-pay subscriber methods are provided.

Method 1: SIM Card Number

Many wireless phones, particularly GSM, have a SIM card that uniquely identifies the phone to the network. This SIM card has a globally unique number both electronically encoded on the card, and physically printed on it. Therefore, when accessing any service that allows creation, modification or deletion of contextual information it may be possible to verify that the subscriber has control over the phone number by requiring them to enter the SIM card number associated with that number. This method includes the following steps:

1. Subscriber purchases a prepay phone (with SIM card),
2. Subscriber is notified, or otherwise gains knowledge about the directory service,
3. Subscriber accesses the directory assistance service (via phone, internet or any other interface the directory assistance service offers),
4. Before allowing maintenance of listing and other contextual information, the system requests the subscriber to enter the number from the SIM card,
5. A password can be sent to the associated mobile phone for verification,
6. The system matches the SIM card number with records of valid SIM card numbers and their associated phone number, and
7. The subscriber may now continue with maintenance of their directory listing profile.

Method 2: Authorization Code Text Message

Many wireless networks have the facility to deliver text messages to and from phones. When accessing a service, the network providing the service could request from the subscriber the phone number or SIM card number. The system can then deliver a text message to the phone. The content of the message would be a randomly generated unique access code. The system can then verify that the subscriber has control over the pertinent number by requiring entry of the access code. This method includes the following steps:

1. Subscriber purchases a prepay phone (with SIM card),
2. Subscriber is notified, or otherwise gains knowledge about the directory service,
3. Subscriber accesses service (via Phone, internet or any other interface the directory assistance service offers),
4. The system sends a text or voice message to the phone number (identified by SIM card number). The content of the message is a unique random access code.
5. The subscriber provides the access code to the system via phone, internet, computer link or SMS message, and
6. The subscriber may now continue with maintenance of their directory listing profile.

Method 3: Account or Other Personal Information

When a subscriber is post-pay, or the service provider has other information about the prepay subscriber that would only expect to be known by the person in control of the phone, the system may request that information before allowing the subscriber to proceed with maintaining their profile. This method includes the following steps:

1. Subscriber purchases a pre-pay phone (with SIM card),
2. Subscriber is notified, or otherwise gains knowledge about the directory service,
3. Subscriber accesses service (via Phone, internet or any other interface the directory assistance service offers),
4. Before allowing maintenance of listing and other contextual information, the system requests the subscriber enters some item of information that the person who purchased the phone/SIM card (or has control of the phone) would only reasonably be expected to know,
5. The system matches this information with records of valid SIM card numbers and their associated personal information, and
6. The subscriber may now continue with maintenance of their directory listing profile.

Community Managed Context Services

The contextual directory 128 also provides management of community groups and can exploit advanced call network features like group broadcast messaging and conference calling without the need for individual searches for subscribers.

As the listings are inherently structured, communities of users are formed. By means of the web 230 application, community managers can be assigned to maintain individual or group subscriber context and connection information relating to their community. Data available to community managers will include all data elements defined for that community. Community managers will have the ability to add, change or delete data elements, community attributes or community members.

Multiple Client/Server Based Contact Databases

Another aspect of the present invention solves the problem of providing connectivity to an individual or group of individuals, while providing privacy and convenience. The description that follows, detailing use of multiple client/server based contacts in a mobile environment, is for convenience and illustration of the features of the invention. It is to be understood that the invention has many embodiments and can be applied whenever access to an individual or group of individuals is needed.

Gaining access to single or multiple contact databases of users is sometimes difficult when the users desire privacy of their contact information. This aspect of the invention allows users/subscribers to access a single or multiple contact databases via a centralized location, where a user/subscriber finds the targeted individual or group of individuals and connects with them, without knowledge of the contact information (e.g., phone number, email address) of the targeted individual or group ("Recipient") via the user's/subscriber's communication device, such as a mobile phone.

Features include:

Access to single or multiple contact databases, such as an address book, via (including, but not limited to) mobile phone, fixed line phone, web-based email, fax User interfaces allows subscribers to select appropriate contact database Permission based rules give subscribers ability to gain access to appropriate, password-protected databases Contact databases are connected to a centralized server operated by service provider, group, or third party operator Services provides direct connection to the target subscriber or group, without customer contact information (e.g., mobile phone number) being revealed.

Contact information (e.g., phone numbers) within the contact database are held private, while direct connections are made via contextual, directory listings of individuals or groups of individuals. Various connectivity devices (e.g., mobile phone, fixed line phone) can be selected if available.

Real-update of individual and group contact information for subscribers

Subscriber or group provisioned and managed customer data

Payment for service provided by service provider or group for access to contact database In one aspect, an individual creates an appropriate alias such as, but not limited to, an alpha numeric string, that is a unique identifier to the individual. These aliases are linked within the appropriate group and only contain the alias of the individual or group of individuals. The individual aliases are linked to the actual contact information (e.g., mobile phone number) of the individual through a key value. This key value provides a link between the targeted individual and the targeted individual's contact information. Thus, the key value allows one individual to contact another individual via the alias without revealing the actual contact information of the Recipient. This ensures that people can be found, within the groups or communities that they belong, without losing control of their privacy.

Thus, an individual would have access to specific contact databases (e.g., address books) that he/she is associated with. The individual would be given permission to gain access to the address book for that community or group through a simple authentication and password. Once authorization is granted, individuals, as well as the administrator of the community or service provider, could create the appropriate alias or aliases of the individuals within the contact database. The individuals could also gain access to such contact database directly from the communication devices that they use, such as a mobile phone. For example, within a mobile device, a contact database or address book could be downloaded directly to the phone or accessed via a data link through either a web address or via a software download. The address book would contain only the alias of individuals, not other contact information, such as their phone numbers. Individuals simply select the alias of the Recipient and a direct communication is made to the Recipient, without revealing the contact information of the Recipient.

Alternatively, the contact database is stored in a centralized location ("Server") where an individual, with appropriate permission, is able to gain access to the contact information. Thus, the contact information is not stored within the communication device of the individual ("Client"), rather at the Server location. When an individual accesses the contact database to place a call, the individual will locate the alias of the Recipient and select the alias to initiate the call. A communication link then occurs between the Client and the Server, requesting connectivity. Through the key value, the Recipient's contact information is located at the Server site, based on the alias, and a call is initiated to the targeted individual. The initiated call is conducted either at the Server site, or another service provider location, where the two parties are connected without revealing the respective contact information.

FIG. 16 illustrates one embodiment of such a multiple client/server based contact database system 500. The caller 505, through a centralized location or database 510, can access single or multiple contact databases 512, 514, 516, to connect with a targeted individual or group of individuals without knowledge of their contact information (e.g., phone number, email address, etc.). Further, the caller 505 can access the targeted individual or group via entry of the targeted individual or group in an address book 522, 524, 526, of the caller 505, where the address book 522, 524, 526, would only include the name or alias of the targeted individual or group and not their respective contact information, thereby ensuring privacy of the contact information while allowing access by connectivity initiation at the caller's 505 mobile phone interface 532, web interface 534, or other interface 536. The centralized database or data store 510 could be managed either by the targeted individual or subscriber 542, the administrator of a group or network 544, or a service provider 546 of the subscriber or group, and is accessible within a user interface 550 of a communication device, including, but not limited to, a mobile phone, fixed phone, email, or fax phone.

FIG. 17 illustrates an aspect of contact information data management 600 within the multiple client/server based contact database system 500. First, a search for a targeted subscriber or group to connect with is initiated by a user or subscriber of the service. The search could occur within various address books 610 of a mobile device 620 of the user or subscriber. The targeted subscriber may reside within one or more of the groups, or perhaps a message is intended for an entire group. A user interface allows a proposed caller to view multiple address books within the single mobile device 620. The caller could then select a specific group within which to search for the targeted subscriber.

Group contact address books 630, 640, 650, are managed by the targeted subscribers listed therein and/or by the administrators of the specific group. Contact information of each targeted subscriber is created and recorded within the applicable group contact database. The contact information could remain secure therein, or could alternatively be made available to, and/or stored within, a central data store server 660. In either aspect, the contact information is retrieved upon connectivity request of the caller via the client mobile device 620.

Targeted subscribers or group administrators can provide various levels of privacy to the contact information entered and stored within the group contact address books 630, 640, 650. For example, as shown in the Group #3 address listing 670, each targeted individual or group can affirmatively select the level of privacy they desire; and particularly whether or not to reveal their contact information. Only the name or alias of the targeted subscriber or group is shown to the user/caller via the address books 610 listed within the client mobile device 620. Upon selection of a targeted subscriber by the user/caller, via the address book 610 of the mobile device 620, the respective contact information is retrieved from either the applicable group contact address book 630, 640, 650, or the central data store 660, depending on the system setup, and the contact information is, or is not, revealed to the user/caller via the client mobile device 610 (as shown in selected Group #3 address listing 680). A service provider of the user/caller, or the targeted subscriber or group, or both, could assess a service charge for the address book search and connection.

Advertising Sponsored Connectivity

An advertising sponsored connectivity model solves the problem of cross-provider or cross-group connectivity via a single text or voice message where the contact information of the target subscriber(s) is not revealed and payment for such a service is provided by a third party. The invention provides a system that allows an individual to find and connect to another individual or a group of individuals to their connectivity devices (including, but not limited to, mobile phone, fixed line phone, VoIP phone, email, fax), where the contact information of the targeted individual is not revealed but the connectivity message is sent, while payment for such a service is provided by a third party sponsor or advertiser. It is to be understood that the invention has many embodiments and can be applied to any system where confidential and secure access to an entity or services are needed. The advertising sponsored model is also applicable to connectivity when the contact information of the targeted subscriber may be revealed to the caller, or to a directory assistance intermediary.

Features include:
- Community messaging to all devices (such as mobile phone, text to speech to fixed line phone, email, fax) via contextual listings
- Payment for service is provided by an alternative party that is not the initiator of the service or call
- Customer contact information (i.e., phone numbers, email addresses) is stored by a central database. Contact information is not revealed in making the connectivity call to recipients.
- Advertising systems based on contextual listings and profile information on individuals and groups that generate ad messages during a search and after a connectivity call has been generated
- Automated self-provisioning and management systems where users can control their own contact information, such as their personal directory listings and contact information.

FIG. 18 illustrates generally one embodiment of an advertising sponsored connectivity system 700, allowing an individual (caller 705) to send out a communication message or notification to others via a single text or voice message. The message generated can be sent to all the respective communication devices (e.g., mobile phone, fixed line phone, email, fax) of the targeted individual or group of individuals.

The caller 705, through a mobile, web or other interface 710, 711, 712, selects a context used to identify the subscriber or group of subscribers to which the caller 705 wishes to send a message. The context is entered on a search device 715, allowing individuals to search for people based on their name, position, group or role (various contexts or aliases) without revealing the contact information (e.g., phone number) of the people sought (recipients). Resolution of the contextual search to the contact information of the targeted subscriber or group, and the degree of privacy associated with the resolution and connectivity is managed by the directory data store 720 and group contact database 725 in accordance with one of various methodologies described supra. The communication message could be sent in real time, or at a specific time in the future.

Payment for connectivity is shifted, in this aspect, from the initiator and/or target of the call, to an alternative party, such as an advertiser. The advertiser could be charged a fee in exchange for an advertisement placed at the end (or the front) of each communication message. The fee could merely offset the cost of connectivity, could equal and be in lieu of the cost of connectivity charged to the caller or callee, or could exceed the connectivity cost.

In one aspect, an individual would be able to gain access to the system, through a web or phone interface, and create a community of users for connectivity. The individual could then send out a group message, for example, to invite those individuals to participate in such a community. The recipients of the invitation could accept or deny the request to participate in the community. The invitation would inform the recipients that the proposed platform would allow individuals within the community to communicate within the community with payment shifted to a third party in exchange for allowing an advertisement to accompany the communication.

The sponsored advertisement would be provided through an advertising system 730 and would appear at the end (or the front) of each message or communication. The advertising system 730 could select the content of any given advertisement based upon profile information stored in a DNS profile manager 735. The profile information could be of the targeted subscriber 740 (callee or recipient), of the user 705 (caller), or of a combination of the profile information of both the caller 705 and targeted subscriber 740.

The recipients 740 could self-provision their own profile information, including, but not limited to, individual first and last name, title, role, address, contact information (e.g., mobile phone, fixed phone, fax, email), financial information (e.g., credit card, debit card, bank accounts), and medical information. Recipients 740 would also be allowed to create unique directory listings or aliases. These aliases can be personal, private or professional in nature. Alternatively, a group community manager 742 and/or a service provider 744 could be provided certain limited rights to provisioning of subscriber 740 or group profile information. In addition, the recipient 740 would select appropriate advertisements that are acceptable, based on the type of industry (wine, office supplies) and any other relevant areas of interest, such as discounts, free goods or services, etc. All of the above would be stored in the DNS profile manager 735 and associated with the respective group contact database 725.

The advertising system 730 would allow advertisers to select the geography, industry and type of individual profile to target with their respective advertisements. For example, an advertiser selects the appropriate advertisement to be placed, based on, but not limited to, geography, type of industry and type of individual.

Example profile information can include:
- Geography: city, state, nation, international (city, country based) or international (region based)
- Industry: education (secondary, college, adult), government (leaders, various departments), public safety (firefighters, EMS, public warning), sports (e.g., football) and social groups (business groups, personal/hobbies—dating, wine tasting), size of business (e.g, large corporations)
- Type of individual: education (e.g., teachers, administrators, students), public safety/government (e.g., administrators, participants), sports (e.g., participants, administrators, owners), social groups (e.g., participants, administrators), business (e.g., management, finance, IT, human resource)

When a message is generated by a user/caller 705 for sending, the advertising system 730 matches an advertiser with the appropriate audience, based on the contextual profile listing information (e.g., information based on the geography, industry and type of individual).

The advertising system 730 would provide, for an advertiser, a simple text-based marketing message that could also include links to other sites. For example, a company could provide a discount for a future purchase, thus providing a link (web or mobile based) to another web site or text code to receive such a discount. The recipient of the advertisement could thereby return inquiry to the advertiser via the link. The identity of the recipient could remain private relative to the advertiser. Via this return inquiry, the recipient of the advertisement could request further product or service information, or could purchase the product or service. Payment could be made electronically, either through credit or debit card information, or directly through the service provider of the recipient, with purchase description itemized on the recipient's next mobile phone or Internet bill, or the service provider of the advertising system 730. In this way, identity and/or contact information of the recipient could remain secure and private even in view of subsequent purchase of product or service from an advertiser.

The advertising sponsored connectivity model detailed above could also be provided without contextual search, and without target subscriber context to contact information resolution occurring via the directory data store 720 and group contact database 725. The advertising sponsored model could be provisioned to standard and traditional communication connectivity methods as well.

FIG. 19 illustrates a connectivity flow diagram of an operating embodiment of an advertising sponsored connectivity model. First, a caller initiates an advertising sponsored communication, which could include a search for a targeted individual or group 805. The search could further involve a contextual directory search for a targeted individual or group 810, as managed by the directory data store 720. Upon locating the targeted individual or group, the user/caller creates a message to be sent 815. Based upon the targeted individual or group, the contextual advertising system 730 generates an advertisement to accompany the message. The advertisement could be sent to one or all of the targeted individual's (i.e., message recipient's) communication devices. The content of the advertisement is determined based upon the DNS listing and/or profile information recorded for the targeted individual, as managed by the DNS profile manager 735. Alternatively, the content of the advertisement could be determined based upon profile information of the user (caller), or upon profile information of a combination of the caller and the targeted subscriber or group.

In the FIG. 19 model, since the caller initiated the communication using a contextual directory search for the targeted recipient, the communication message will be private; that is, the message is sent without the phone number or other contact information of the recipient being revealed to the caller, or even to the advertising message system 825. The communication message is generated and associated with the created contextual based advertisement 830. The completed communication message 835 is then sent to the targeted individual or group 845, and can be directed to any one or all of the targeted individual's 845 communication devices.

Accordingly, in one embodiment of the invention combining multiple client/server based contact databases and advertising sponsored, a method and system for providing a caller with a communication connection to a subscriber over a communication network is provided. In this embodiment, the network includes a data center, a caller network, and a subscriber network. The data center includes one or more contextual databases that store a secure identity key for each respective subscriber and at least one context for each respective subscriber associated with the secure identity key. The caller network communicates with a caller database storing at least one context for a respective subscriber. The caller network also communicates with the one or more contextual databases. The subscriber network communicates with a subscriber database that stores subscriber contact and profile listing information, and associates the subscriber contact and profile listing information with the respective secure identity key. The subscriber network also communicates with the one or more contextual databases.

A context for a targeted subscriber is received at the data center from the caller network. The context is entered by a caller, upon call initiation, on one of the caller's communication devices. At the data center, one or more of the contextual databases are used to retrieve a matching context and the associated secure identity key. The matching occurs without requiring use or exposure of the contact and profile listing information of the targeted subscriber. The retrieved secure identity key is forwarded to the subscriber network, where the contact information of the targeted subscriber corresponding to the secure identity key is retrieved. Then, the caller is provided a communication connection to the targeted subscriber, without requiring that the subscriber contact information be released to the caller, to the caller network, or to the data center.

In another aspect of this embodiment, an advertisement accompanies a message sent upon communication connection. The advertisements could be sponsored by a party other than the caller or the targeted subscriber, and revenue generated by the advertisement could be used to discount a fee associated with communication connection, or to render the communication free for the caller and/or the targeted subscriber.

In other aspects, the advertisement could include one or more links to an advertiser, the link providing the targeted subscriber with communication connectivity to the advertiser. This connectivity to the advertiser is provided without requiring that the targeted subscriber contact information be released to the caller, to the caller network, to the data center, or to the advertiser. This connectivity could further allow the targeted subscriber to request information, or to acquire goods or services, from the advertiser, without requiring that financial, personal, or contact information of the targeted subscriber be released to the caller, to the caller network, to the data center, or to the advertiser.

Further, the content of the advertisement is determined based upon the profile listing information of the targeted subscriber. Further, selection of an advertiser could also be determined based upon the profile listing information of the targeted subscriber matched with desired profile listing information provided by the respective advertiser.

In a separate embodiment, another method and system for providing a user with a communication connection to a subscriber is provided. The method and system involve a data center, a subscriber network, and an advertising center. The data center is adapted to receive a context for a targeted subscriber as provided by a user, the data center including one or more contextual databases that store a secure identity key for each respective subscriber and at least one context associated with each secure identity key. In response to a context received, the data center retrieves a matching context and the associated secure identity key from the one or more contextual databases without requiring use or exposure of contact information of the targeted subscriber.

In this separate embodiment, the subscriber network is in communication with the data center, and with a subscriber database that stores subscriber contact and profile listing information. In response to receiving the retrieved secure identity key, the contact information of the targeted subscriber is retrieved from the subscriber database, facilitating a communication connection of the user to the targeted subscriber. The communication connection would include a message to the targeted subscriber accompanied by an advertisement. The message would be sent without requiring that the contact information of the targeted subscriber be released to the user or to the data center.

Lastly, in this separate embodiment, the advertising center is in communication with the data center and the subscriber network, and manages selection of content of the advertisement. The advertisement content is selected based on the profile listing information of the targeted subscriber. The advertising center can also manage selection of an advertiser. In this aspect, the advertiser and the advertisement content are selected based on the profile listing information of the targeted subscriber matched with desired profile listing information provided by participating advertisers. Further features and aspects of the advertising model, such as communications and transactions between the advertiser or merchant the targeted subscriber, without revealing identity, contact or financial information of the targeted subscriber, could also be implemented in this embodiment.

EXAMPLES

The following are examples that illustrative various implementations of the present invention. These examples are not exhaustive and do not represent any limitation on the scope of the invention or other possible alternative embodiments.

Example 1

Wireless Directory Assistance

Background

A directory is important to any application, on any platform. Directories store information about people and resources. High value applications, especially those in a communications network, rely on the directory as a foundation for all applications. In the telecommunications industry, however, directory assistance is based on old models of proprietary control and olds methods limited to name, city, state and country look up. The present invention solves the problem of subscriber access and provides a variety of contact connections and source of services. For example, mobile and wireline customers can take advantage of the present invention's features, which provide directory, communication and commercial services over the telephone.

The Problem

Existing directory services have not kept pace with the multitude of new communications devices. This is especially true for mobile phones and Internet Protocol (IP) devices. These directories have evolved from a system of local monopoly networks that were not focused or attentive to consumer demands and diversified services. The lack of subscriber directory services for mobile devices demonstrates that the old directory model lacks the flexibility and features to attract mobile listings and usage. There are several key reasons for this:

1. In traditional wireline systems there is typically a single provider with a single directory in one region. In each region, the directory belonged to the one provider and concern for competition for subscribers was not a factor. In wireless systems there may be many regional providers competing for the same subscriber base, so a single provider directory will not work. Mobile directories must be multi-provider and broadly available.
2. As there are several providers servicing the same customer this raises the concern on the part of providers for customer retention and security, and the concern of subscribers for multi-provider directory service.
3. Mobile devices have been considered personal and intrusive. In some countries the receiving party pays, so subscribers need greater control in their listings to give them privacy and flexibility. The present invention addresses and solves this problem.
4. Mobile devices lack a context in which an inquiry can be made. A physical address is not relevant to a mobile device, and people do not often know the address of the subscriber they are trying to call. The present invention addresses and solves this problem.
5. The rise in use of pre-pay subscribers means that network operators often know little about their subscriber base and they have no method in which a prepaid subscriber can participate in a directory service or be located. The present invention addresses and solves this problem.

The Solution: Contextual Directory

A contextual directory is a new type of mobile directory assistance service. It provides a natural way for people or resources to be found based on identifying them in a known community or context with structured word driven listings. Further, by allowing partial or complete self-management of the contextual directory by the subscriber or some other party, the directory listing will be more accurate and available for regular subscriber and transient subscriber users alike.

A contextual-based directory assistance solution allows individuals to find and connect to wireless subscribers across multiple telecommunications network providers (AT&T, Verizon, Telstra, etc.) and devices (mobile phone, WAP, PDA, PC, standard telephones, etc.) A subscriber can have multiple listings, which would allow the subscriber to be found by multiple contexts and ways. A listing can be the person's identifier—name, alias or position, within a context. A subscriber will have at least one contextual listing selected by the subscriber. Some examples of contextual listings include:

| VERBAL LISTING | FORMAL LISTING NOTATION |
| --- | --- |
| WildMan in Wellington | Wildman@Wellington.Region.NewZealand |
| Golfer at Pebble Beach | Golfer@Pebblebeach.Monterey.NorthernCalifornia.Region.USA |
| Joe Smith in North Ryde, Australia | Joe.Smith@NorthRyde.Sydney.NSW.Region.Australia |
| Rod at Context Connect | Rod.Drury@ContextConnect.Corporate.USA |

Unlike telephone numbers or an address, a contextual listing is easy to verbalize and remember. The advantage of a contextual listing is that it provides inherent security, they are stored in a formal structure, enabling directory automation. The contextual directory, comprised of contextual listings, is much easier and more simple to use, is very flexible, easily updateable, and provides privacy and therefore will dramatically increase connectivity over all network providers.

The advantage of contextual listings, including its ease of use and the implementation of secure connectivity according to the present invention, will greatly drive up connectivity demand across multi-provider networks as it securely maintains and protects proprietary subscriber information. The features of the present invention are further enhanced by the power of the subscriber's provider network or the internet, allowing subscribers to maintain their own listings and add other features to their service such as billing paying, shopping, parcel delivery, banking and other applications that add value to and increase use of their network provider service.

System Overview

Figure 5:
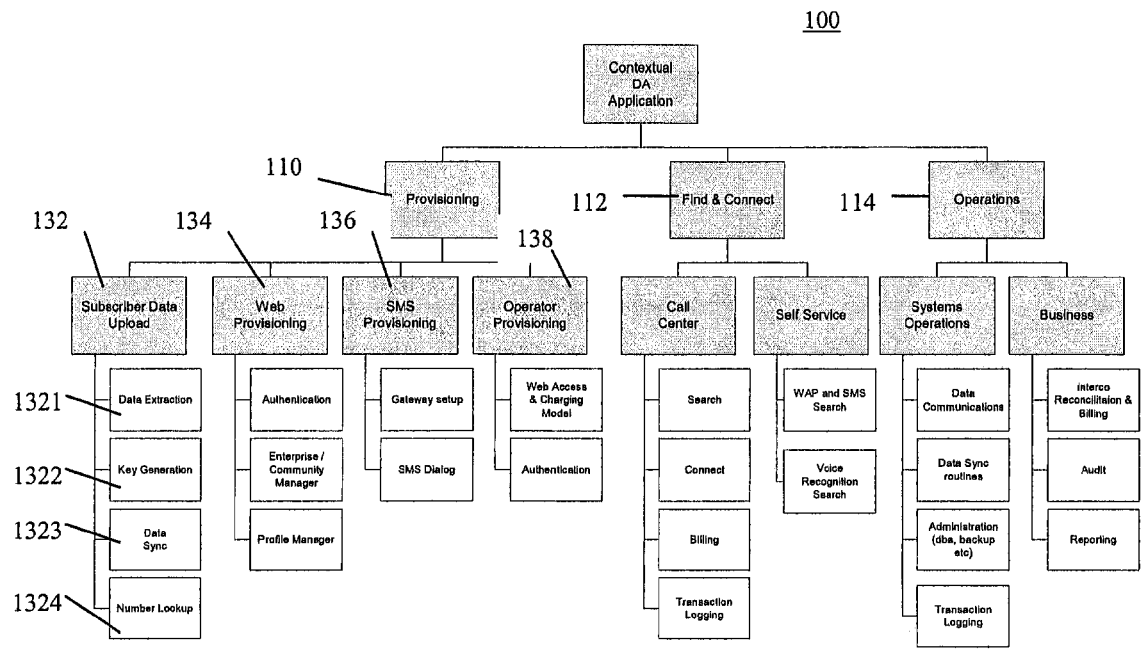
FIG. 5 illustrates a functional diagram of the directory assistance system according to one embodiment of the present invention.

A functional diagram of the directory assistance system 100 is illustrated in FIG. 5. The system 100 has main functional elements for operation of the system. These main elements include Provisioning 110, allowing a user to create and manage its own listings, Find & Connect 112 for providing directory assistance service so that users can connect to a device, service or subscriber, and Operations 114 for providing management and administration of the service. These main functional elements are implemented by several systems components, which are illustrated in FIG. 6.

The system components include at least one telecommunication provider network 120 where subscriber billing information is collected, pre-paid services are managed, and calls are switched to a call center 122. At the call center 122, calls are accepted and an operator function is available to assist the caller with database searches. When the subscriber is located, the call is routed back to the caller's network for connection to the required party. In the subscriber number database 124, a network operator function provides a regular extract of subscriber information required to operate the system. At all times proprietary subscriber data remains secure within the telecommunication network 120. The data center 126 contains the contextual directory database 128 and performs the associated provisioning 110 and operations 114.

Secure Identity Key

Within each provider network 120, a subscriber database 124 is maintained containing all of that network operator's subscriber numbers and associated keys 130. The key 130 is the unique alphanumeric identifier, generated by the subscriber database 124 which can only be used by the network provider 120 to associate either the subscriber or the subscriber's wireless number. Whenever the subscriber or the network provider creates a contextual listing, it is associated with that subscriber's (or number's) key 130 are also created and provided to the data center 126 for associating the listing. Only the key 130 and the listing are stored in the contextual directory database 128 in the data center 126. The proprietary subscriber wireless number associated with the listing, however, remains securely in the network provider's subscriber database 124. Accordingly, the key 130 is a secure link between the provider network 120 and the contextual database 128, providing complete security for the proprietary subscriber data maintained in the subscriber database 124.

This architectural approach is designed to allow a directory assistance call center 122 to operate without requiring the provider network 120 to provide the subscriber's contact number to either the caller 140 or the call center 122. This approach eliminates the need to publish subscriber numbers or to provide them to other network providers. This is an important competitive consideration for network providers that view their subscriber database 124 as their most valuable network asset.

By maintaining subscriber number security, network providers would be encouraged to utilize call centers 122 to consolidate subscriber access across competitive subscriber networks over one consolidated service without the loss of control or revenue.

Example 2

Context Connection and Secure Identity Key

Referring to FIG. 6, a caller uses the directory assistance system to connect to a wireless subscriber by dialing a call center 122. The call proceeds as a normal operator assisted directory assistance call. The caller would dial a short number to reach the directory assistance operator and request a connection to a called party. The subscriber can be an inter- or intra-network subscriber 200 having a context that is known to the caller and belongs to the person or entity the caller 140 wishes to reach. In this example, the context is "Marlies at Context Connect". The operator would then search the contextual directory 128 for the requested listing. If a match is found, the key 130 stored with the contextual listing will be used to determine with which network provider the contextual listing is associated. The key 130 is then provided to the network provider to search in the subscriber database 124 for the corresponding subscriber's number. Having retrieved the number, the call is forwarded to the subscriber through the network provider 120. Alternatively, after retrieving the number, the calling party's call is dropped back to the caller's network for connection through the PSTN to the subscriber without connection through directory assistance network. The retrieved subscriber number is never made available to the calling party. The call center operator does not have access to the subscriber's number either. Only the context in which the listing party has established themselves is available at the call center 122.

Example 3

Provisioning Services

Referring to FIG. 5, the system 100 supports a range of provisioning 110 that allow subscribers to create and maintain their listings. The provisioning feature 110 includes:
1. Bulk provisioning from subscriber data held by operators 132,
2. Web portal subscriber self-provisioning 134,
3. SMS/WAP based subscriber self-provisioning 136, and
4. Operator assisted provisioning through the call center 138.

In general, each provisioning feature relies on subscriber data extraction 1321 from a network provider's customer care system, where the subscriber data is loaded into the subscriber database resident on a subscriber database server.

Generic Provisioning Process

Figure 7:
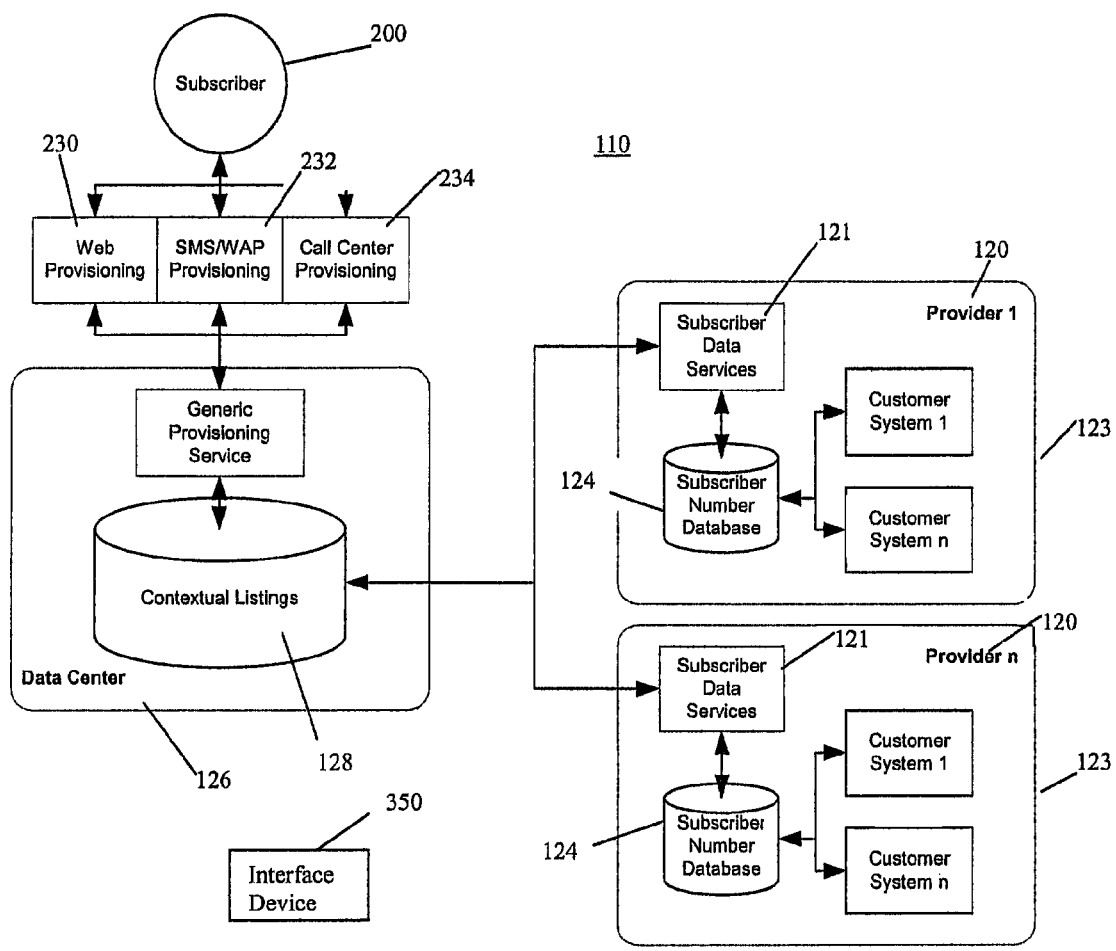
FIG. 7 illustrates an interface device with a directory assistance system according to one embodiment of the present invention.

An example of the elements of a generic provisioning feature 110 is illustrated in FIG. 7. The subscriber data extract process populates the subscriber database 124 with at least the subscriber number and a unique key 130. Each provisioning process will be required to authenticate the subscriber and access the subscriber database 124 with the subscriber number to obtain the unique key 130 associated with that number. Each provisioning process will execute the following steps:
1. Authenticate the source of the provisioning request,
2. Identify the operation associated with this provisioning request as Add, Change or Delete,
3. Acquire the subscriber's required listing text,
4. Parse the listing text for compliance to listing rules associated with the provisioning operation,
5. Acquire the number for the subscriber's listing,
6. Use the number to search the Subscriber Database for the associated key,
7. Submit the listing text, key and operator identifier to the Data Center for appropriate action, and
8. Report back to the originator, the result of the provisioning action.

Subscriber Data Upload Provisioning

Periodically the data center 126 will request an upload of new, modified or deleted subscriber information from the subscriber data services module 121 on the subscriber data server 123. Specific treatment of the subscriber data upload 132 is necessary to ensure a clear and smooth process for moving data from the provider network 120 into the data center 126. There are two situations where full uploads will be required at the initial extract from a new provider, and when network providers do not support more targeted updates. To handle this form of update, the first step is to establish whether the extract affects all records, or a subset of the provider database. To support this the extractor will need a "data source" field in the interface. Subscriber data upload 132 should check whether the subscriber data server 123 is available to perform a required transaction and report an error when the service does not respond.

Subscriber Self Provisioning and Profile Management

Through a Web 230, WAP/SMS 232, or call center 234 interface, subscribers 200 can manage their own details on the service. Data changed by subscribers 200 will cause an update of the information that the call center 122 accesses for searching. Different caller interfaces, display of button features, logos, provider information and identification can be made available for each network provider 120 so that the subscriber 200 perceives they are dealing directly with their own provider network to preserve the valuable commercial relationship.

Community Managed Context Services

As the listings are inherently structured, communities of users are formed. By means of the web 230 application, community managers can be assigned to maintain individual or group subscriber context and connection information relating to their community. Data available to community managers will include all data elements defined for that community. Community managers will have the ability to add, change or delete data elements, community attributes or community members.

Example 4

Find and Connect Services

Figure 8:
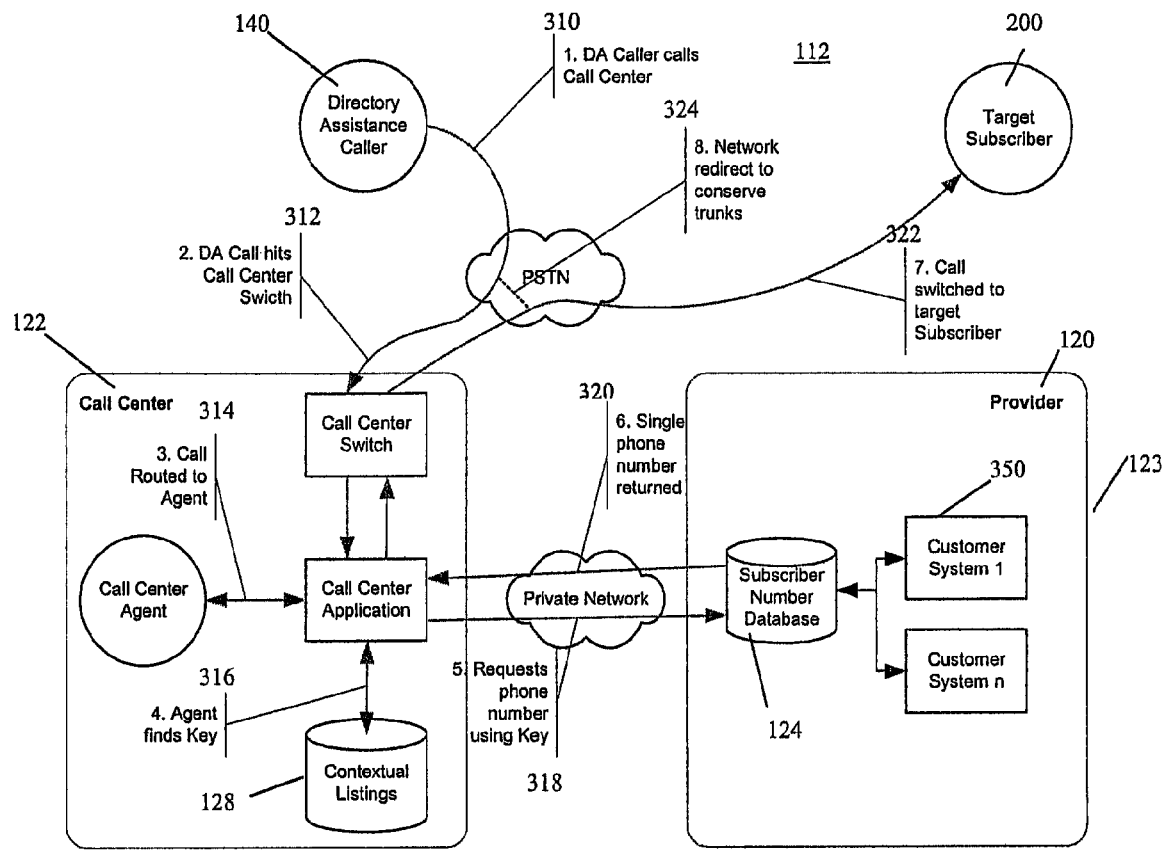
FIG. 8 illustrates a find and connect service associated with the directory assistance system according to one embodiment of the present invention.

The find and connect service 112 provides directory assistance services and connects the customers to a device, service or subscriber. An example of the find and connect service 112 is illustrated in FIG. 8. The steps for an implementation of connecting callers to providers using a contextual directory service are also shown in FIG. 8. It is to be understood that other implementations of the system are possible and may differ depending upon the technical requirements of the provider network 120.

In general, call routing involves at least one provider network 120 participating in the service, at least one call center 122 that answers the directory assistance call, a directory assistance caller 140, the caller 140 (whether person or entity) requesting contact with a subscriber 200. The targeted subscriber 200 is a person, group, or device that is listed in the contextual directory 128 and available to receive calls. The call and information flow is as follows:

1. The directory assistance caller 140 makes a call to the service through the PSTN 310,
2. The call is routed through the PSTN to the call center 122 arriving at the call center switch 312,
3. The call center switch 312 receives the call and routes it to the appropriate agent 314 (at this stage IVR technologies can be used to begin the searching process by doing an initial filtering process),
4. The agent 314 takes the name and context for the search 316 (the search application on the agent desktop provides the search interface; the application does a number of background steps; the first step is to find the key value that matches the listing the agent has located),
5. The second step the search application performs is a query to the Subscriber Data Number Database 124 (of the provider that the key value belongs to) that matches the key value to a single phone number 318,
6. The third step is the receipt of the single phone number to the application 320,
7. That phone number is then used to connect the call 322 to the target subscriber 200 (at this point the switch may need to generate the appropriate billing records depending on the physical implementation), and
8. Where possible the call should be handled in such a way that the use of trunks and other network resources is minimized 324.

Extended Directory Services

The connectivity data provided by the subscribers 200 allows for extended directory services that can be charged to the network operator. These include:

1. The ability to charge for an operator sent email, optionally, without the target email address being known,
2. Operator initiated SMS, optionally, without revealing the target subscriber phone number,
3. Direct to Voice Message services, optionally, without the number being known,
4. Group messaging and conference call set up, based on the community connectivity information, and
5. Subscriber managed connectivity rules, based on calling party and time of day.

Community Managed Context Services

The contextual directory 128 also provides management of community groups and can exploit advanced call network features like group broadcast messaging and conference calling without the need for individual searches for subscriber.

Example 5

Subscriber Device Connectivity

Background

The contextual database also supports directory assistance and connectivity to an interface device 350 using Short Message Service (SMS) or Wireless Application Protocol (WAP) and voice recognition protocols. The system 10, through the structures that search for the target subscriber, provide the appropriate device protocol and data format as required by the interface device 350 for effective communication.

The Problem

The problem with these devices is that they provide caller identification, which may not be desirable for a multi-provider network. SMS and WAP protocols are designed to retrieve a phone number. In the present invention, however, the proprietary subscriber number is not stored in the contextual directory 128. Compounding this problem, are those instances when the target subscriber wishes to provide its phone number, which is not available from a call placed through a call center 122.

The Solution

This present invention, by means of its contextual listings 128, provides enhanced functionality to find and reference a subscriber without compromising the security of the proprietary phone number or identity of the subscriber. An illustration of a directory assistance system 10 for use with an interface device 350 is shown in FIG. 7. Any interface device 350 that is capable of constructing a message and connecting to a central telecommunication server can be used to initiate a call. For example, using a mobile phone and SMS or WAP, a request to connect to a person is constructed and sent to a central telecommunication server.

That message might contain the instruction to 'call John.Doe@hotmail.com'. The central telecommunication server can interpret the message and resolve the actual target number (B number) by looking up 'John.Doe@hotmail.com' and finding the matching phone number or pointer to a telecommunications service that can complete the call with this information. The central telecommunications server will know the identity (A number) of the calling party and can then place a call between the parties. The target phone number (B number) never needs to be revealed to the calling party (A number).

Using similar technology an internet user can construct a request to place a call on their browser. If the calling party is authenticated by the service, the telecommunication server receives the request and the calling party identity (A number). The telecommunications server 123 then looks up the target phone number (B number) using the information available from the call center 122 and completes the call to both parties.

Other Benefits

Telecommunication and internet services are converging through new mobile packet technologies such as General Packet Radio Service (GPRS) and Time Division Multiple Access (TDMA), which allow permanent IP connection between the phone and network. Taking advantage of this technology, the invention also provides the mobile interface device 350 with enhanced telephony interface through an HTML or WAP interface. By this feature, the invention can configure and provide a telephone or interface device 350 with additional functionality, directly upgrading such remote devices through the network provider server 123. Instead of replacing the interface device 350 with changing technology, the same device is merely reconfigured by the system remotely. Accordingly, new services and features can be rapidly deployed without the need to obtain additional equipment or cost.

This feature also provides a secure interface between the phone and telecommunications device so that more powerful devices such as computers and PDA's can easily construct calls (and other telecommunications transactions) with simpler devices such as a telephone or facsimile machine. As an example, existing analogue devices can be used to receive calls initiated from other more sophisticated devices, such as a small bandwidth wireless PDA.

Implementation

As an example, instead of a handset dialing a number directly, the device sends a context message to the server. These messages might be encoded but might be simple messages like 'call 617 1234 4567' which is sent to a smart switch. The switch knows who sent the message, understands the method 'CALL' and understands the parameter '617 1234 4567'. Using this information the switch completes the circuit by seeking a connection to a subscriber 200 as described in the call method described here.

Examples of a context message are:
1. Call Sunny at Context Connect,
2. Conference Call, Rod, Sunny and Bob
3. Divert to Office until 9:00 PST
4. Send an email to Rod, "Lets make lunch 12:30 Tuesday"

An example of an XML message is:

```
<message>
    <method>Ringback</method>
    <target match="Phonebook|Number|Directory">Bob</target>
    <expiry uom="minutes">60</expiry>
<message>
```

This message corresponds to "Have Bob call me back as soon as his phone is free, but only in the next hour". This feature supports the move to remote server based storage of individual subscriber information allowing it to be made available to and from multiple devices as determined by the network provider, the subscriber, or both. For example, by means of the call method described here, the person requested, Bob, can be searched from data at the call center 122, or from an interface device 350.

Another feature of the invention is that the interface device 350 need not to be attached to the calling device. For example, a disposable device having the ability to receive calls, can obtain messages from any user interface device 350 such as a computer or PDA having an IP connection. Existing low functionality devices (like older mobile phones) can be augmented with new interfaces delivered by computer or PDA. In addition, many new services can be added requiring only changes to be made in the web server application or WAP interface without deploying new handsets.

Example 6

E-commerce, Revenue Generation, and Billing Services

The present invention 10 also provides a method for e-commerce, revenue generation, and billing services using existing network provided billing systems and infrastructure and still protecting the subscribers information. These features are made available to standard subscribers and pre-paid phone and card users. Through the context listing directory 128, all subscribers and users have access to their individual network provider 120. And the providers have access to the subscribers and users directly and through the system 10.

The present invention expands the transactional capability of a network provider system as follows:
1. It allows the network provider and other utility providers to realize new revenue opportunities leveraging their billing system assets.
2. It allows the network providers to earn money on the float of money held until remitted to the e-commerce sites.
3. It allows consumers without credit cards to participate in online purchasing.
4. It enables new micro payment transaction channels because the network provider billing systems have a core competency of being able to aggregate a large number of small transactions. Consequently it becomes economically feasible to bill customers for internet and e-commerce purchases.
5. It allows Subscribers and Providers to participate in these transactions without putting customer information at risk.

The present invention 10 utilizes 'Single Sign In' and 'Wallet' technologies where a centralized server handles the sign in requests for multiple sites, or provides centralized Wallets such as Microsoft Passport and Wallet. At sign up or account modification the subscriber completes the online contract and ensures their details are correct. The sign in method for establishing a Contextual Listing and/or this online contract has a Trust relationship with the sign in method's above. Affiliate retail web sites will enable this payment type on their sites to increase their volumes. When a purchase of this type is made the transaction is recorded by the Sign In Authority or Wallet Provider In order to full understand the steps, a sample transaction is provided.

Set Up

Figure 11:
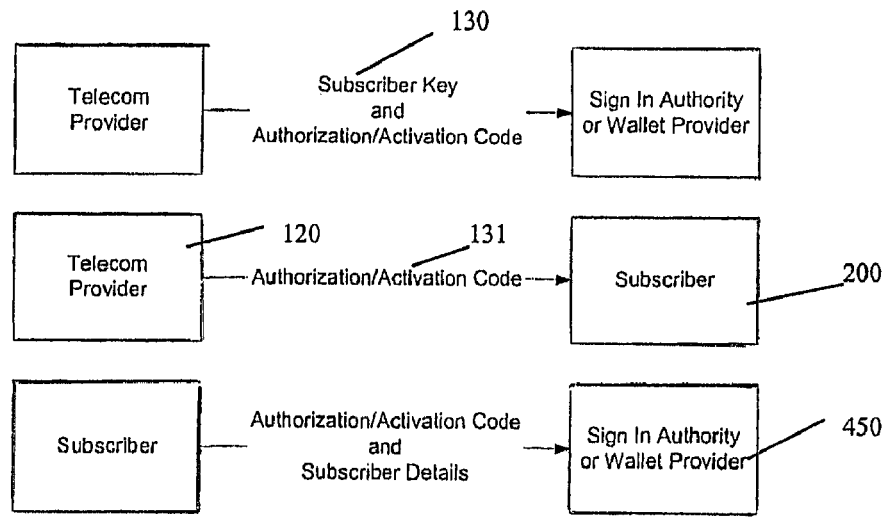
FIG. 11 is a flow diagram illustrating the setup process of a method for e-commerce, revenue generation and billing services, in accordance with one embodiment of the present invention, the setup process establishing relationships between a subscriber, a network provider and a sign in authority.

The setup process as shown in FIG. 11 establishes the relationship between the subscriber 200, the network provider or network provider 120 (the billing channel) and the sign in or wallet authority 450. Each network provider 120 provides a subscriber security or account key 130 as well as an authorization code 131. The subscriber 200 is provided with the authorization code 131, which ensures that only the subscriber can activate its account. The subscriber 200 can redeem the activation code 131 with the sign-in authority or wallet provider 450.

Authentication

Figure 12:
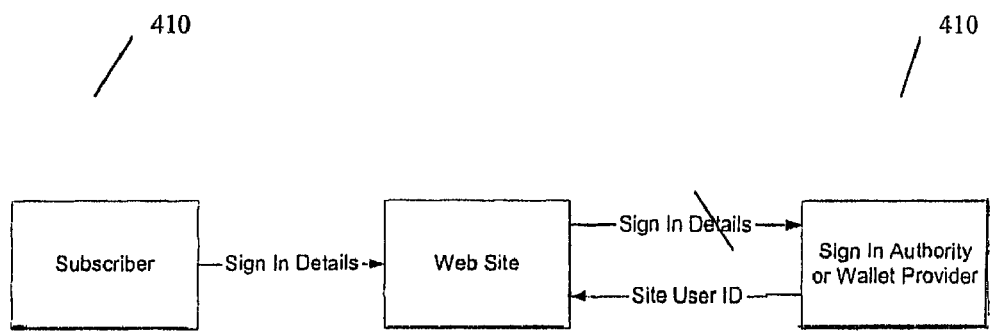
FIG. 12 is a flow diagram illustrating an authentication process for the method of e-commerce transactions of FIG.

During the e-commerce session the subscriber 200 must authenticate 420 itself to either the sign-in authority or wallet 450, as shown in FIG. 12. This might be done at the beginning of the e-commerce session or during the payment process 440. To the subscriber 200 it may appear that it is signing into the e-commerce site but it is actually being authenticated on either the sign-in authority or the wallet provider 450. The sign-in authority 450 would return back a user ID 133 to track the subscriber 200.

Transaction

When a transaction 430 is made, the transaction details are recorded by the web site and passed back to the wallet or sign-in authority 450, as shown in FIG. 13, where the details are routed to the appropriate network provider 120.

Bill Presentation and Payment

The network provider 120 aggregates the transactions and presents them to the subscriber 200 in a monthly bill, as shown in FIG. 14.

Settlement

In the final step of the transaction, as shown in FIG. 15, the network provider extracts a fee 444 for executing the transaction.

Example 7

Multiple Client/Server Based Contact Database System

FIG. 20 illustrates an example multiple client/server based contact database 900 in accordance with one embodiment of the present invention. Here, individual profiles 905, including personal information of the targeted subscriber, are created and stored in a targeted subscriber or group service provider database 910 (group database 910). The individual profiles 905 for each targeted subscriber of the group are then linked to the contextual databases 915, 920 via a key value, remaining within the group database 910.

Alternatively, the individual profile 905 information, residing within the group database 910, can either be linked to contextual database #1, 915, via the key value, or all or part of the information of the individual profile 905 can be stored in contextual database #2, 920. If all or part of the personal information included in the individual profile 905 is stored in contextual database #2, 920, contextual database #2, 920, is then linked to contextual database #1, 915, via the key value.

The key value, linked to the personal information in the individual profiles 905 in the group database 910, is linked to an alias or contextual name in the contextual databases 915, 920. Through a service provider 925, or directly to contextual database #1, 915, an individual (caller) can access personal information in the group database 910, necessary to connect and communicate with a targeted subscriber or group, using the alias of the targeted recipient or group, without having or ever receiving knowledge of the personal information (e.g., contact phone number) residing in the individual profile 905 of the targeted subscriber or group.

Initiating a call through the service provider 925 provides that the caller could have previously programmed, in an address listing of his communication device (e.g., mobile phone), the alias and/or contextual information of the targeted subscriber or group, without including in the address listing any contact information of the targeted subscriber or group. The system therefore provides that the caller can initiate connectivity right from his communication device, without knowing contact information of the target, and without involving a directory assistance system or operator. The caller can initiate a call from his communication device, without knowledge of the contact information of the target, just as the caller would initiate a call from his communication device when knowing the target's contact information.

The FIG. 20 multiple client/server based contact database system arrangement provides that contextual database #1 and #2, 915, 920, can be managed by either separate system service providers or the same service provider. Contextual database #2, 920, can contain all or part of the personal information included in an individual profile 905. Contextual database #1, 915, contains only the alias and key value of the targeted subscriber or group, which links via the key value to the personal information of the individual profiles 905 in contextual database #2, 920, or in the group database 910, depending on a level of privacy associated with each portion of personal information desired and selected by the targeted subscriber or group manager.

The FIG. 20 system configuration provides flexibility to system operation and privacy provisioning, as each bit of personal information contained in an individual profile 905 need not be retrieved from the group database 910, beyond reach of the system service provider. Personal information with a lower privacy requirement can be released to the system service provider, and stored in contextual database #2, 920, for ease of access, while still confidential relative to the caller. Personal information with a high privacy requirement can, at the same time, remain stored only in the group database 910, for access and management only by the targeted subscriber or group manager, remaining confidential relative to the caller and the system service provider maintaining and with access to confidential database #1, 915, and confidential database #2, 920.

Example 8

Another Multiple Client/Server Based Contact Database System

FIG. 21 illustrates an example multiple client/server based contact database 950 in accordance with another embodiment of the present invention. Here, individual profiles 905, including personal information, contact information, and/or financial information of targeted subscribers or groups, are created and stored directly in contextual database #2, 920, and/or contextual database #1, 915. The personal, contact, and/or financial information of the individual profiles 905 are linked in the contextual databases 915, 920, to a key value. The key values are cross-linked between contextual database #1, 915, and contextual database #2, 920. A particular arrangement might have more sensitive subscriber information stored in contextual database #2, 920, while less sensitive subscriber information is entered in contextual database #1, 915, thus providing an additional layer of privacy for the subscriber.

A service provider database 925 includes an alias or other contextual information for each targeted subscriber or group linked to the respective key value assigned to the respective targeted subscriber or group. Alternative embodiments of the invention might have the subscriber contexts or aliases linked to the respective key value assigned to each targeted subscriber stored in contextual database #1, 915.

Through the service provider 925, or directly to contextual database #1, 915 (in the alternative embodiment), an individual (caller) can connect and communicate with a targeted subscriber or group, using the alias of the targeted recipient or group, without having or ever receiving knowledge of the personal information (e.g., contact phone number) residing in the individual profile 905 of the targeted subscriber or group. The FIG. 21 multiple client/server based contact database system arrangement provides that contextual database #1 and #2, 915, 920, can be managed by either separate system service providers or by the same service provider.

Accordingly, in one aspect, the FIG. 21 multiple client/server based contact database arrangement provides a method and system for providing a caller with a communication connection to a subscriber. In this aspect, the network includes a caller network having a caller database, the caller database storing a secure identity key for each respective subscriber and at least one context for each respective subscriber associated with each secure identity key, and a call center in communication with the caller network, the call center including one or more call center databases storing subscriber contact information, and associating the subscriber contact information with the respective secure identity key.

Further, in this aspect, the caller network would receive a context for a targeted subscriber, and the caller database would retrieve a matching context and the associated secure identity key. The context would be matched to the key without requiring use or exposure of the contact information of the targeted subscriber. Then, the secure identity key would be forwarded to the call center, and the one or more call center databases would retrieve the contact information of the targeted subscriber corresponding to the retrieved key. The caller would then be provided a communication connection to the targeted subscriber without requiring that the subscriber contact information be released to the caller or to the caller network.

In another aspect of this embodiment, the context for the targeted subscriber received at the caller network could be provided by the caller, upon call initiation, by entry of the context on the caller's communication device.

In still another aspect of this embodiment, the call center would include two call center databases, call center database #1 and call center database #2. The contact information of the subscriber would be limited to storage in call center database #2 (contextual database #2 in FIG. 21). Retrieving the contact information of the targeted subscriber corresponding to the retrieved secure identity key would therefore occur in call center database #2 by passing the secure identity key retrieved and forwarded by the caller network through call center database #1. This would provide an additional increment of privacy to sensitive subscriber contact, personal, or financial information, and would thereby provide the caller with a communication connection to the targeted subscriber without requiring that the subscriber contact information be revealed to call center database #1, or the service provider of call center database #1. In this aspect, service providers could still be arranged where call center database #1 and #2 are managed by separate service providers, or by the same service provider.

Example 9

Advertising Sponsored Connectivity

FIG. 22 illustrates an example advertising sponsored connectivity model of the present invention. In this model, individual profiles 905 are created by the targeted user (recipient), either through self-provisioning application, through the administrator of a group, or by their service provider. Personal information included in each individual profile 905 would include, but not be limited to, information directed to types of advertisements deemed acceptable by the targeted subscriber or group, which could be based on geography of the recipient, recipient interests, type of market, type of services requested by the recipient, and/or other recipient demographics.

Merchants participating in the advertising sponsored connectivity system would select a type of recipient of interest, based on recipient information including, but not limited to, geography, interests, type of industry, market, services requested, and/or other demographics. Upon a caller's selection of a targeted subscriber or group, and indication of intent to connect and send a message, the merchant requested advertisements are matched (as managed by a profile manager within an advertising server 980) with the personal information included in the individual profile 905 of the caller's selected target.

Connectivity is made, and a message sent, through methodologies detailed infra involving one or more contextual databases. Accordingly, connectivity between the merchant and the recipient is private. No personal information of the recipient need be released to the caller, to the merchant, or even to the system service provider.

The advertisement could include information, provide discounts associated with a purchase based on the advertisement, and/or other offers, information, or promotions. The advertisement could provide a link (web or mobile based), directing the recipient to a web site or to a text code to receive such a discount. The link could also direct the recipient to the merchant's website. The recipient of the advertisement could thereafter return inquiry to the merchant (advertiser) via the link. In accordance with connectivity methodologies detailed infra, the identity of the recipient could remain private relative to the merchant. Via this return inquiry, the recipient of the advertisement could request further product or service information, or could directly purchase the product or service. Payment could be made electronically, either through credit or debit card information, or directly through the service provider of the recipient, with purchase description itemized on the recipient's next communication connectivity bill, or through the advertising system service provider, or through another third party. In this way, the identity, the contact information, and/or the financial information of the recipient could remain secure and private, even in view of the subsequent transaction with the merchant.

In this embodiment, advertisements generated by the merchant are not based on an individual making or requesting a service (a caller), but on the private personal information of the individual being targeted (recipient), as contained in the respective individual profile 905. If a match is made by the profile manager at the advertising server 980, the contextual databases 915, 920, act to send the advertisement(s) to the recipient, along with the message. If the recipient requests for information, based upon receipt of the advertisement, further information, discounts, and/or purchase of goods and services from the Merchant could be obtained by the recipient. The recipient's alias might be provided to the Merchant for identity purposes, and the requested information and/or goods/services could be provided to the recipient through the contextual databases 915, 920, without revealing the true identity, or sensitive contact and/or credit card information, of the recipient. Accordingly, privacy of the recipient is maintained.

Accordingly, in one aspect, the FIG. 22 advertising connectivity model provides a method and system for advertising sponsored community-based messaging across multi-providers or multi-groups over a communication network. In this aspect, the network includes a subscriber database, the subscriber database storing profile listing information for each of targeted subscribers and targeted groups of subscribers in the community, and an advertising center in communication with the subscriber network and an advertising database that stores, for each participating advertiser, profile listing information of targeted subscribers and targeted groups of subscribers of interest to the respective advertiser. The advertising center manages selection of an advertiser, and selection of the content of an advertisement to accompany a message sent to a targeted subscriber or group of advertisers.

Further, in this aspect, the advertising center receives from a caller information identifying a targeted subscriber or group of subscribers and content of a message to be sent to the targeted subscriber or group of subscribers. The advertising center selects an advertiser and the content of an advertisement to accompany the message, based upon a matching of the profile listing information of targeted subscribers and targeted groups of subscribers of interest to respective advertisers stored in the advertising database, and the profile listing information of the targeted subscribers and groups of targeted subscribers stored in the subscriber database.

In another aspect of the advertising model, the profile listing information includes characteristics of geography, type of industry, and type of individual, for each targeted subscriber. In this aspect, the advertisement is sponsored by the advertiser, rendering the communication connection free or discounted for the caller and the targeted subscriber or group of subscribers.

In another aspect of this model, the advertisement includes a link to the advertiser, the link providing the targeted subscriber or group of subscribers with communication connectivity to the advertiser. The communication connectivity to the advertiser can be provided without requiring that contact information of the targeted subscriber or group of subscribers be released to the caller, to the advertising center, or to the advertiser.

The link to the advertiser allows the targeted subscriber or group of subscribers to request information, or to acquire goods or services, from the advertiser. The targeted subscriber or group of subscribers can acquire goods or services from the advertiser without requiring that financial information of the targeted subscriber or group of subscribers be released to the caller, to the advertising center, or to the advertiser.

Another embodiment of the present invention could combine features of Examples 8 and 9, above, to provide a method and system for providing a user with an advertising sponsored communication connection to a subscriber. The method and system involves a caller network, a data center, and an advertising center. The caller network includes a caller database adapted to receive a context for a targeted subscriber as provided by a user (caller). The caller database stores a secure identity key for each respective subscriber and at least one context associated with each secure identity key. In response to a context received, the caller database retrieves a matching context and the associated secure identity key without requiring use or exposure of contact information of the targeted subscriber.

The data center of this embodiment is in communication with the caller network, and stores subscriber contact and profile listing information. In response to receiving the retrieved secure identity key, the contact information of the targeted subscriber is retrieved from one or more data center databases, facilitating a communication connection of the user to the targeted subscriber. The communication connection would include a message to the targeted subscriber accompanied by an advertisement. The message would be sent without requiring that the contact information of the targeted subscriber be released to the caller or to the provider network.

Lastly, in this embodiment, the advertising center is in communication with the data center, and manages selection of content of the advertisement. The advertisement content is selected based on the profile listing information of the targeted subscriber. The advertising center can also manage selection of an advertiser. In this aspect, the advertiser and the advertisement content are selected based on the profile listing information of the targeted subscriber matched with desired profile listing information provided by participating advertisers. Further features and aspects of the advertising model, such as communications and transactions between the advertiser or merchant and the targeted subscriber, without revealing identity, contact or financial information of the targeted subscriber, could also be implemented.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for providing a caller with a communication connection to a subscriber over a communication network, the network including:
   a data center including one or more contextual databases, the contextual databases storing a secure identity key for each respective subscriber and at least one context for each respective subscriber associated with the secure identity key;
   a caller network in communication with a caller database storing at least one context for a respective subscriber, the caller network also communicating with the one or more contextual databases;
   a subscriber network in communication with a subscriber database, the subscriber database storing subscriber contact and profile listing information, and associating the subscriber contact and profile listing information with the respective secure identity key, the subscriber network also communicating with the one or more contextual databases;

the method comprising the steps of:

receiving at the data center, from the caller network, a context for a targeted subscriber as entered by a caller, upon call initiation, on a caller communication device;

using the one or more contextual databases to retrieve a matching context and the associated secure identity key without requiring use or exposure of the contact and profile listing information of the targeted subscriber;

forwarding the retrieved secure identity key to the subscriber network;

retrieving from the subscriber database the contact information of the targeted subscriber corresponding to the retrieved secure identity key; and providing the caller a communication connection to the targeted subscriber, without requiring that the subscriber contact information be released to the caller, to the caller network, or to the data center.

2. The method of claim 1, wherein an advertisement accompanies a message sent upon communication connection.

3. The method of claim 2, wherein the advertisement is sponsored by a party other than the caller or the targeted subscriber, and revenue generated by the advertisement renders the communication connection free or discounted for the caller and the targeted subscriber.

4. The method of claim 2, wherein the advertisement includes a link to an advertiser, the link providing the targeted subscriber with communication connectivity to the advertiser.

5. The method of claim 4, wherein communication connectivity to the advertiser is provided without requiring that the targeted subscriber contact information be released to the caller, to the caller network, to the data center, or to the advertiser.

6. The method of claim 4, wherein communication connectivity to the advertiser allows the targeted subscriber to request information, or to acquire goods or services, from the advertiser.

7. The method of claim 6, wherein the targeted subscriber acquires goods or services from the advertiser without requiring that financial information of the targeted subscriber be released to the caller, to the caller network, to the data center, or to the advertiser.

8. The method of claim 2, wherein content of the advertisement is determined based upon the profile listing information of the targeted subscriber.

9. The method of claim 2, wherein content of the advertisement and a respective advertiser is determined based upon the profile listing information of the targeted subscriber matched with desired profile listing information provided by the respective advertiser.

10. A method for providing a caller with a communication connection to a subscriber over a communication network, the network including:

a caller network including a caller database, the caller database storing a secure identity key for each respective subscriber and at least one context for each respective subscriber associated with each secure identity key;

a call center in communication with the caller network, the call center including one or more call center databases storing subscriber contact information, and associating the subscriber contact information with the respective secure identity key, the method comprising the steps of:

(a) receiving a context for a targeted subscriber at the caller network;

(b) using the caller database to retrieve a matching context and the associated secure identity key without requiring use or exposure of the contact information of the targeted subscriber;

(c) receiving the retrieved secure identity key at the call center, as forwarded from the caller network;

(d) retrieving from the one or more call center databases the contact information of the targeted subscriber corresponding to the retrieved secure identity key; and (e) providing the caller a communication connection to the targeted subscriber, without requiring that the subscriber contact information be released to the caller or to the caller network.

11. The method of claim 10, wherein the context for the targeted subscriber received at the caller network is provided by the caller, upon call initiation, by entry on a caller communication device.

12. The method of claim 10, wherein the call center includes two call center databases, call center database #1 and call center database #2, and retrieving the contact information of the targeted subscriber corresponding to the retrieved secure identity key occurs in call center database #2 by passing the retrieved secure identity key forwarded by the caller network through call center database #1, thereby providing the caller with a communication connection to the targeted subscriber without requiring that the subscriber contact information be revealed to call center database #1.

13. The method of claim 12, wherein call center database #1 and #2 are managed by separate service providers.

14. The method of claim 12, wherein call center database #1 and #2 are managed by the same service provider.

\* \* \* \* \*

UNITED STATES PATENT AND TRADEMARK OFFICE
CERTIFICATE OF CORRECTION

| | | |
|---|---|---|
| PATENT NO. | : 7,899,173 B2 | Page 1 of 1 |
| APPLICATION NO. | : 11/654966 | |
| DATED | : March 1, 2011 | |
| INVENTOR(S) | : Ahn et al. | |

It is certified that error appears in the above-identified patent and that said Letters Patent is hereby corrected as shown below:

On the title page item (75), add --Robert A. Stern, Los Altos, CA (US)--

Signed and Sealed this
Third Day of November, 2015

Michelle K. Lee
*Director of the United States Patent and Trademark Office*